(12) United States Patent
Moon et al.

(10) Patent No.: US 11,943,100 B2
(45) Date of Patent: *Mar. 26, 2024

(54) APPARATUS AND METHOD FOR SUPPORTING TSC

(71) Applicant: Samsung Electronics Co., Ltd., Suwon-si (KR)

(72) Inventors: Sangjun Moon, Suwon-si (KR); Kisuk Kweon, Suwon-si (KR); Youngkyo Baek, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/059,837

(22) Filed: Nov. 29, 2022

(65) Prior Publication Data

US 2023/0090268 A1 Mar. 23, 2023

Related U.S. Application Data

(63) Continuation of application No. 17/037,549, filed on Sep. 29, 2020, now Pat. No. 11,516,078.

(30) Foreign Application Priority Data

Sep. 3, 2019 (KR) .................. 10-2019-0121218
May 15, 2020 (KR) .................. 10-2020-0058419
(Continued)

(51) Int. Cl.
*H04W 56/00* (2009.01)
*H04L 41/0806* (2022.01)
(Continued)

(52) U.S. Cl.
CPC ....... *H04L 41/0806* (2013.01); *H04W 56/001* (2013.01); *H04W 72/0446* (2013.01); *H04W 76/10* (2018.02)

(58) Field of Classification Search
CPC ............. H04L 41/0806; H04W 76/10; H04W 56/001; H04W 72/0446
(Continued)

(56) References Cited

U.S. PATENT DOCUMENTS 9,921,888 B1 3/2018 Skeffington et al.
10,270,567 B1 4/2019 Rang et al.
(Continued)

FOREIGN PATENT DOCUMENTS

WO 2019166081 A1 9/2019

OTHER PUBLICATIONS

European Patent Office, "Supplementary European Search Report," dated Oct. 21, 2022, in connection with European Patent Application No. 20872787.5, 11 pages.
(Continued)

*Primary Examiner* — Sai Ming Chan

(57) ABSTRACT

A method, performed by a network entity, of performing time sensitive communication (TSC) includes: establishing a first protocol data unit (PDU) session with a first user equipment (UE) and a second PDU session for a second UE; receiving, from the first UE, an announce message obtained from a first time sensitive network (TSN) node; configuring, based on the announce message, a port state of the network entity; and transmitting, to the second UE or a second TSN node, the announce message.

10 Claims, 23 Drawing Sheets

(30) Foreign Application Priority Data

Jul. 17, 2020 (KR) .................. 10-2020-0089162
Jul. 21, 2020 (KR) .................. 10-2020-0090578

(51) Int. Cl.
*H04W 72/0446* (2023.01)
*H04W 76/10* (2018.01)

(58) Field of Classification Search
USPC ........................................................ 370/254
See application file for complete search history.

(56) References Cited

U.S. PATENT DOCUMENTS

| | | | |
|---|---|---|---|
| 2016/0127118 A1* | 5/2016 | Yun .................. | H04L 7/0008 |
| | | | 375/357 |
| 2017/0237838 A1 | 8/2017 | Vandevoorde et al. | |
| 2019/0239172 A1 | 8/2019 | Hampel et al. | |
| 2019/0289616 A1 | 9/2019 | Hampel et al. | |
| 2020/0259896 A1* | 8/2020 | Sachs .................. | H04L 67/10 |
| 2022/0030530 A1* | 1/2022 | Munz .................. | H04L 12/4625 |
| 2022/0030533 A1* | 1/2022 | Munz .................. | H04W 56/005 |

OTHER PUBLICATIONS

Vivo, "PDU session procedures for support of TSN bridge," 3GPP TSG-SA WG2 Meeting #134, Sapporo, Japan, S2-1907441, Jun. 24-28, 2019, 19 pages.

Ericsson et al., "Merger of soln11.3 and Soln 28," 3GPP TSG-SA WG2 Meeting #132, Xian, China, S2-1904716, Apr. 8-12, 2019, 13 pages.

Ericsson, "5G bridge port allocation and mapping tables," 3GPP TSG-SA WG2 Meeting #134, Sapporo, Japan, S2-1907475, Jun. 24-28, 2019, 5 pages.

"3rd Generation Partnership Project; Technical Specification Group Services and System Aspects; System Architecture for the 5G System (5GS); Stage 2 (Release 16)", 3GPP TS 23.501 V16.2.0 (Sep. 2019), 389 pages.

Samsung, "Updates for Deterministic Delay QoS", SA WG2 Temporary Document, 7SA WG2 Meeting #129Bis, Nov. 26-30, 2018, S2-1813069, 9 pages.

Notification of Transmittal of the International Search Report and the Written Opinion of the International Searching Authority, or the Declaration dated Jan. 15, 2021 in connection with International Patent Application No. PCT/KR2020/013358, 10 pages.

Examination Report dated Jan. 9, 2024, in connection with Indian Patent Application No. 202237023268, 8 pages.

* cited by examiner

APPARATUS AND METHOD FOR SUPPORTING TSC

CROSS-REFERENCE TO RELATED APPLICATIONS

This application is a continuation of application Ser. No. 17/037,549, now U.S. Pat. No. 11,516,078 issued Nov. 29, 2022, which is based on and claims priority under 35 U.S.C. § 119 to Korean Patent Application No. 10-2019-0121218 filed on Sep. 30, 2019, Korean Patent Application No. 10-2020-0058419 filed on May 15, 2020, Korean Patent Application No. 10-2020-0089162 filed on Jul. 17, 2020 and Korean Patent Application No. 10-2020-0090578 filed on Jul. 21, 2020 in the Korean Intellectual Property Office, the disclosures of which are herein incorporated by reference in their entirety.

BACKGROUND

1. Field

The disclosure relates to an apparatus and a method for supporting time sensitive communication (TSC). More particularly, the disclosure relates to an apparatus and a method for providing time synchronization between terminals by interconnecting a time sensitive network (TSN) with a 5G system (5GS) as a wireless communication system.

2. Description of the Related Art

In order to meet the increasing demand with respect to wireless data traffic after the commercialization of 4G communication systems, efforts have been made to develop improved 5G communication systems or pre-5G communication systems. For this reason, 5G communication systems or pre-5G communication systems are called Beyond 4G network communication systems or Post LTE systems. In order to achieve a high data transmission rate, consideration is given to implementing 5G communication systems in millimeter wave (mmW) frequency bands (e.g., 80 giga-Hertz (GHz) bands). In order to reduce propagation path loss of radio waves and increase a propagation distance of radio waves in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme such as hybrid frequency shift key (FSK) and quadrature amplitude modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent Internet Technology (IT) service for collecting and analyzing data generated by connected things and creating a new value in people's lives may be provided. IoT is applicable to various fields, such as smart homes, smart buildings, smart cities, smart cars or connected cars, smart grids, health care, smart home appliances, and advanced medical care, via the fusion and combination of existing information technology (IT) with various industries.

Accordingly, various attempts are being made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

Because the provision of various services is enabled due to the developments of the above-described wireless communication systems, methods of smoothly providing time synchronization between terminals by interconnecting a time sensitive network (TSN) with a wireless communication system are required.

SUMMARY

Provided are a method and apparatus capable of effectively supporting services in a wireless communication system.

Additional aspects will be set forth in part in the description which follows and, in part, will be apparent from the description, or may be learned by practice of the presented embodiments of the disclosure.

According to an embodiment of the disclosure, a method, performed by a network entity, of performing time sensitive communication (TSC) includes: establishing a first protocol data unit (PDU) session with a first user equipment (UE) and a second PDU session for a second UE; receiving, from the first UE, an announce message obtained from a first time sensitive network (TSN) node; configuring, based on the announce message, a port state of the network entity; and transmitting, to the second UE or a second TSN node, the announce message.

The port state of the network entity may be determined by a user plane function (UPF) or a time sensitive network application function (TSN AF).

A port state of the first UE may be a slave state, and the port state of the network entity and a port state of the second UE may each be a master state.

The method may further include: receiving, from the first UE, a sync frame by using the first PDU session; performing local switching on the sync frame; and transmitting, to the second UE, the sync frame by using the second PDU session, wherein a sum of a uplink (UL) UE-device-side-TSN-translator (DS-TT) residence time, a first packet delay budget (PDB) of the first PDU session and a downlink (DL)

UE-DS-TT residence time, and a second PDB of the second PDU session is less than 10 milliseconds (ms).

TSC assistance information (TSCAI) may be determined, by a session management function (SMF), based on a first burst arrival time (BAT) for the first PDU session and a second BAT of the second PDU session.

A port of the first UE and a port of the second UE may be determined by a TSN application function (TSN AF).

Second schedule information for the second PDU session may correspond to a result of (first schedule information for the first PDU session)+(device-side TSN translator (DS-TT-UE) residence time for uplink (UL))+(UL PDB)+(UE-to-UE UPF Residence Time)−(downlink (DL) residence time).

According to an embodiment of the disclosure, a network entity for performing time sensitive communication (TSC) includes: a network-side time sensitive network translator (NW-TT); and at least one processor connected with the NW-TT and configured to: establish a first protocol data unit (PDU) session with a first user equipment (UE) and a second PDU session for a second UE; receive, from the first UE, an announce message obtained from a first time sensitive network (TSN) node; configure, based on the announce message, a port state of the network entity; and transmit, to the second UE or a second TSN node, the announce message.

The port state of the network entity may be determined by a user plane function (UPF) or a time sensitive network application function (TSN AF).

A port state of the first UE may be a slave state, and the port state of the network entity and a port state of the second UE may each be a master state.

The at least one processor may be further configured to: receive, from the first UE, a sync frame by using the first PDU session; perform local switching on the sync frame; and transmit, to the second UE, the sync frame by using the second PDU session, wherein a sum of a uplink (UL) UE-device-side-TSN-translator (DS-TT) residence time, a first packet delay budget (PDB) of the first PDU session and a downlink (DL) UE-DS-TT residence time, and a second PDB of the second PDU session is less than 10 ms.

TSC assistance information (TSCAI) may be determined, by a session management function (SMF), based on a first burst arrival time (BAT) for the first PDU session and a second BAT of the second PDU session.

S port of the first UE and a port of the second UE may be determined by a TSN application function (TSN AF).

Second schedule information for the second PDU session may correspond to a result of (first schedule information for the first PDU session)+(device-side TSN translator (DS-TT-UE) residence time for uplink (UL))+(UL PDB)+(UE-to-UE UPF Residence Time)−(downlink (DL) residence time).

According to an embodiment of the disclosure, a method, performed by a first user equipment (UE), of performing time sensitive communication (TSC) includes: establishing a first protocol data unit (PDU) session with a network entity; receiving, from the network entity, an announce message obtained from a second UE; and configuring, based on the announce message, a port state of the first UE, wherein the network entity establishes a second PDU session with the second UE, and wherein the second UE obtains the announce message from a first time sensitive network (TSN) node.

A port state of the first UE may be a slave state, and the port state of the first UE and a port state of the network entity may each be a master state.

First schedule information for the first PDU session may correspond to a result of (second schedule information for the second PDU session)+(device-side TSN translator (DS-TT-UE) residence time for uplink (UL))+(UL packet delay budget (PDB))+(UE-to-UE user plane function (UPF) Residence Time)−(downlink (DL) residence time).

According to an embodiment of the disclosure, a first user equipment (UE) for performing time sensitive communication (TSC) includes: a device-side time sensitive translator (DS-TT); and at least one processor connected with the DS-TT and configured to: establish a first protocol data unit (PDU) session with a network entity; receive, from the network entity, an announce message obtained from a second UE; and configure, based on the announce message, a port state of the first UE, wherein the network entity establishes a second PDU session with the second UE, and wherein the second UE obtains the announce message from a first time sensitive network (TSN) node.

A port state of the second UE may be a slave state, and the port state of the first UE and a port state of the network entity may each be a master state.

First schedule information for the first PDU session may correspond to a result of (second schedule information for the second PDU session)+(device-side TSN translator (DS-TT-UE) residence time for uplink (UL))+(UL packet delay budget (PDB))+(UE-to-UE user plane function (UPF) Residence Time)−(downlink (DL) residence time).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
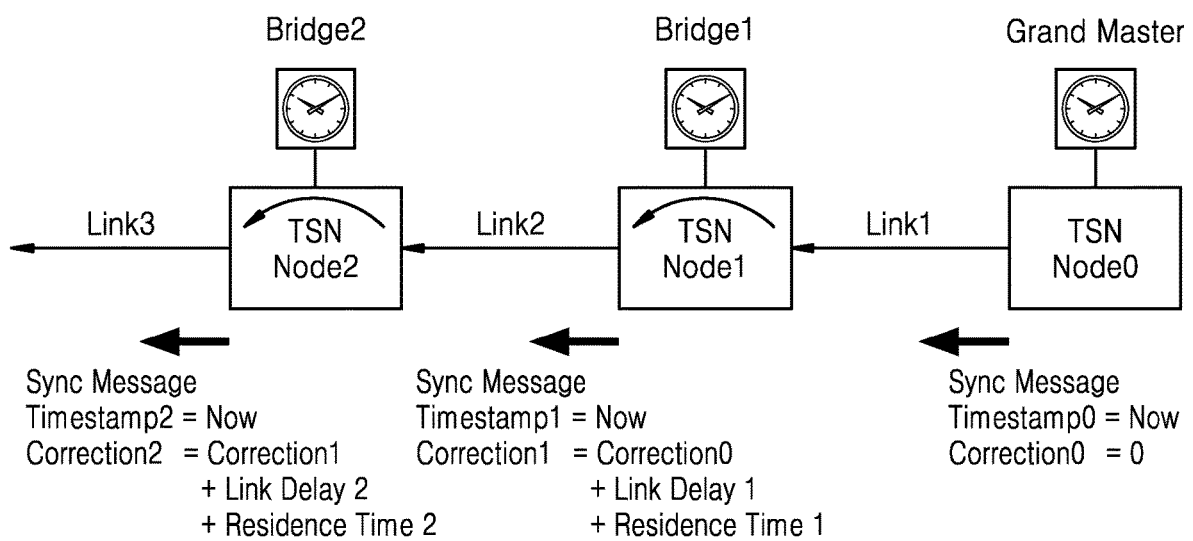
FIG. 1 illustrates a view for explaining a principle of time synchronization over Ethernet of a time sensitive network (TSN), according to an embodiment of the disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Operation principles of the disclosure will now be described more fully with reference to the accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Hereinafter, for convenience of description, the disclosure uses terms and names defined in a $5^{th}$ generation (5G) system (5GS) standard and a New Radio (NR) standard, which are the latest standards defined in the 3rd Generation Partnership Project (3GPP), from among current communication standards. However, the disclosure is not limited to the terms and names but may also be identically applied to wireless communication networks that comply with other standards. In particular, the disclosure may be applied to the 3GPP 5GS/NR (5G mobile communications standard).

Time synchronization of related nodes is needed to support scenarios such as factory automation. In particular, in a situation requiring precise work, the accuracy of time synchronization needs to be high. When using Ethernet for industrial purposes, time sensitive networking (TSN) technology, which is a method of supporting time synchronization between Ethernet-connected notes, has been studied and has been commercially used.

FIG. 1 is a view for explaining a time synchronization principle on Ethernet of TSN, according to an embodiment of the disclosure.

In a manufacturing site, various networks may be used according to the configuration requirements of equipment and systems necessary for each factory. When networks with different standards are used, there may be difficulties in flexible system management. According to an embodiment of the disclosure, an apparatus and method of synchronizing times between TSN nodes when the TSN nodes operate according to different time standards are provided.

Nodes of Time Synchronization in Ethernet (TSN) (hereinafter, TSN nodes) may determine a Grand Master (GM) which serves as a reference. When TSN Node0 is determined to be a GM, TSN Node0 may generate Sync Frame by inserting a current time of the GM in a Timestamp field and filling a Correction field with 0, and may transmit the generated Sync Frame to a next node. TSN Node1, which is the next node, may receive Sync Frame subjected to Link Delay 1, and update the Correction field by taking into account up to Residence Time1 as a time during which the received Sync Frame resides in TSN Node1, thereby generating Sync Frame and transmitting the same to TSN Node2 which is a next node. TSN Node2 may receive Sync Frame subjected to Link Delay 2, and update the Correction field by taking into account up to Residence Time2 as a time during which the received Sync Frame resides in TSN Node2, thereby generating Sync Frame and transmitting the same to a next node (not shown). Each node periodically measures a delay time for a link with a previous node and calculates and manages an average of measured delay times. In addition, each node may have a method of calculating a residence duration in its own node.

Figure 2:
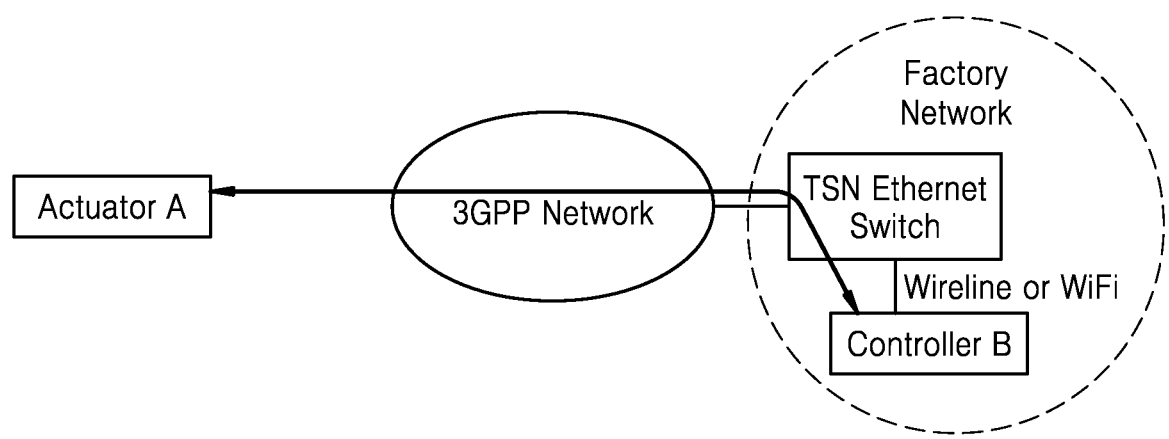
FIG. 2 illustrates a scenario of supporting TSN time synchronization of a 5G network, according to an embodiment of the disclosure.

FIG. 2 illustrates a scenario of supporting TSN time synchronization of a 5G network, according to an embodiment of the disclosure.

In detail, FIG. 2 illustrates a factory automation scenario that supports mobility of a UE, to which the 5G network has been applied. In this case, the 5G network may support TSN. Referring to FIG. 2, Actuator A may include a UE-side component. For example, Actuator A may include a UE, and a TSN Node connected to the UE. A 3GPP network may include a base station and some components of a core network. For example, the 3GPP network may include, but is not limited to, a UE, a gNB, and a user plane function (UPF). Referring to FIG. 2, the 3GPP network may be connected to a factory network. The factory network may include a TSN Ethernet switch and a controller B connected via a wired network, but embodiments are not limited thereto. The factory network may include other components.

Figure 3:
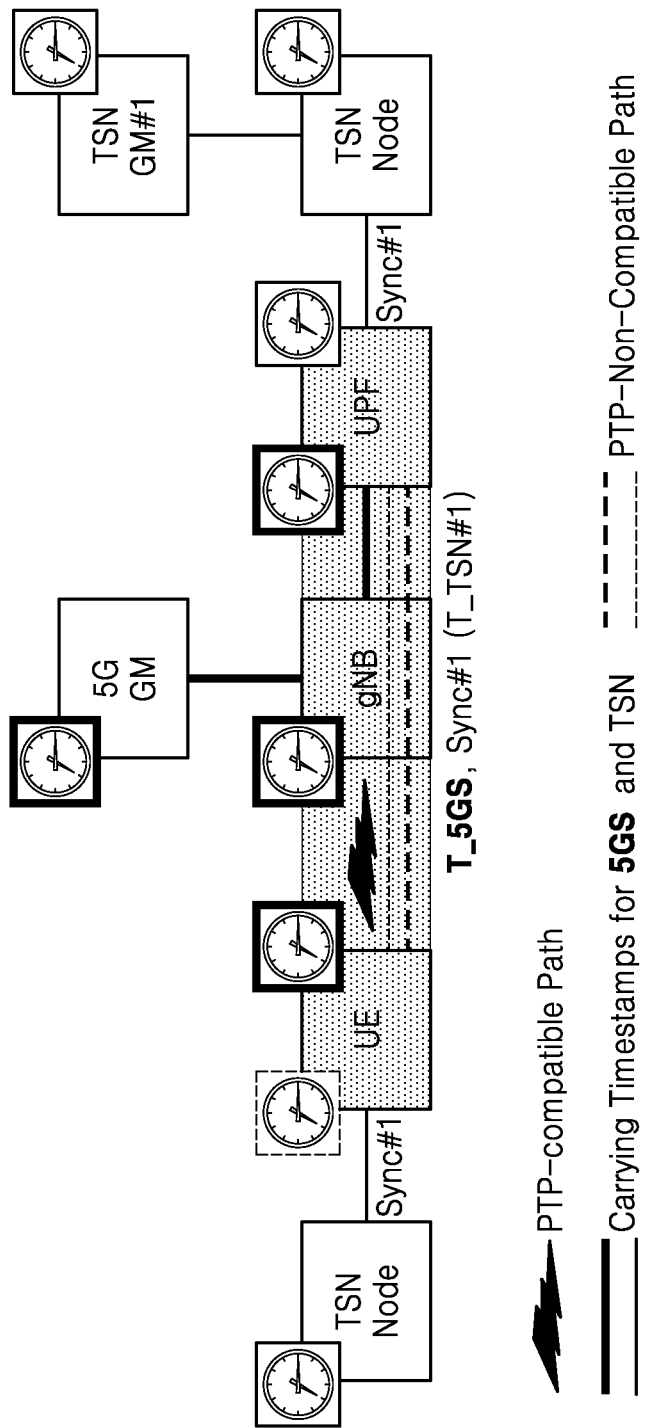
FIG. 3 illustrates a method in which a 5G network supports TSN time synchronization, according to an embodiment of the disclosure.

FIG. 3 illustrates a method in which the 5G network supports TSN time synchronization, according to an embodiment of the disclosure.

FIG. 3 is a schematic diagram for explaining a method in which the 5G network supports TSN in such a situation as shown in FIG. 2. In the disclosure, the 5G network is referred to as a network including a UE, a gNB, and an UPF. In detail, the 5G network including a UE, a gNB, and an UPF is modelled to one TSN Bridge (TSN node) of FIG. 1. In other words, UPF-gNB-UE as the 5G network may operate as a single TSN node, and this TSN node may support TSN by updating Sync Frame by correcting Link Delay and Residence Time. To this end, it is assumed that the UPF, the gNB, and the UE within the 5G network are synchronized with a common 5G GM. For example, the gNB may be connected to a GPS, the UPF may be connected to the gNB via Ethernet-based TSN and synchronized with the gNB, and the UE may be synchronized with the gNB by transmitting and receiving PHY Frame to and from the gNB. The UPF may be connected to a TSN node of a wired network, and the UE may also be connected to a TSN node of a wired network. Referring to FIG. 3, because the GM of TSN exists in the TSN node connected to the UPF, the UPF receives Sync Frame from the TSN node connected to the UPF. The UPF records Ingress Time of the received Sync Frame as a time point based on the 5G GM. The UPF may periodically calculate and manage Link Delay with the TSN node connected to the UPF. The UPF may deliver Sync Frame including Ingress Time and Link Delay to the UE. The UE may calculate Residence Time, which is a residence time within the 5G network, as a 5G GM-based time of the moment when Sync Frame is transmitted to the TSN node connected to the UE. For example, the UE may calculate Residence Time and Link Delay, based on a 5G GM-based time of the moment when Ingress Time recorded as a 5G GM-based time and Sync Frame are transmitted to the TSN Node. The UE may generate Sync Frame by updating a Correction field by using the Residence Time and the Link Delay, and may transmit the generated Sync Frame to the TSN node connected to the UE.

Figure 4:
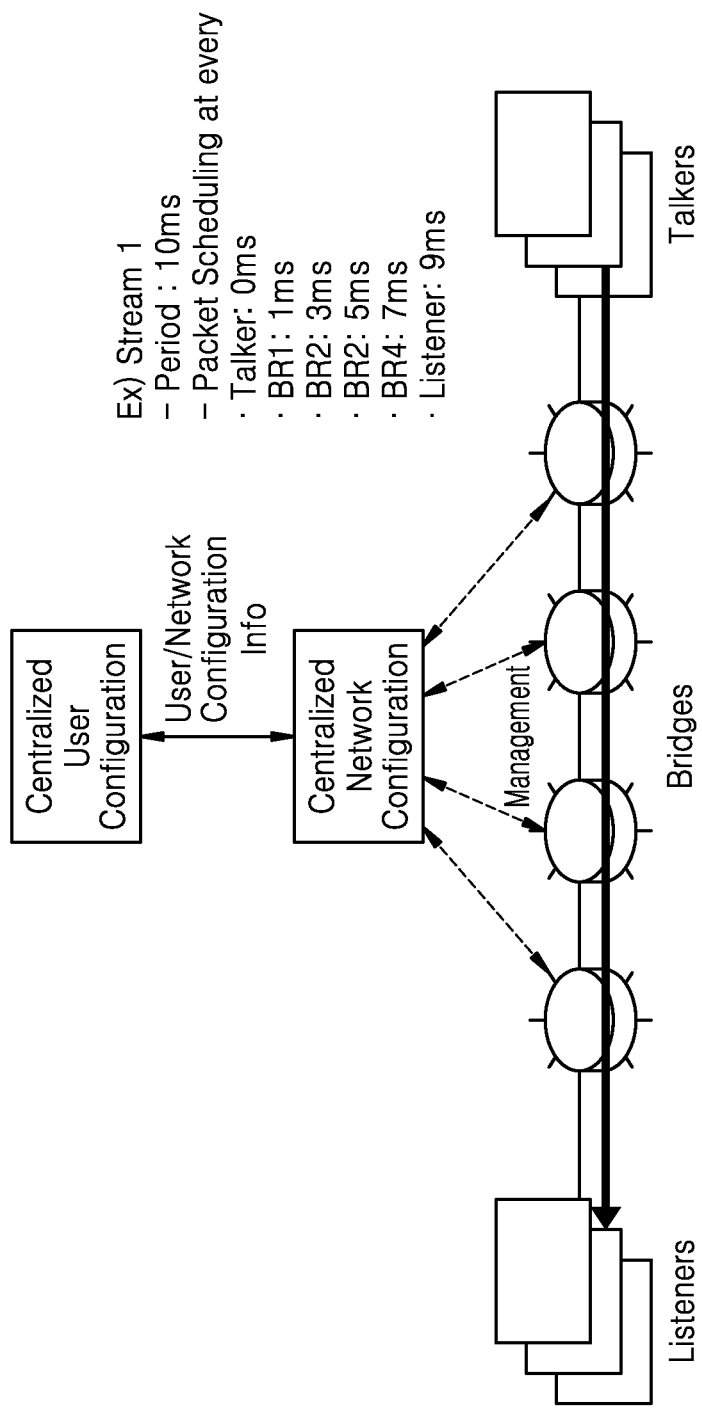
FIG. 4 illustrates a schematic diagram for explaining a Management function according to an embodiment of the disclosure.

FIG. 4 is a diagram for explaining a Management function of TSN according to an embodiment of the disclosure.

There are two types of TSN nodes: a bridge and an end-station. A bridge from among the TSN nodes may send its own Port configuration and its own Scheduling capability to a centralized network configuration (CNC) server, and an end-station from among the TSN nodes may send, to the CNC server, information of time sensitive communication (TSC) Stream 1 that is transmitted/received. The CNC server may inform schedule information at each TSN node for each stream, and the TSN nodes may reflect the schedule information to ensure that the stream is delivered while undergoing a certain delay. For example, when Stream 1 is transmitted by a Talkers Node (End-Station) and a transmission period of Stream 1 is 10 millisecond (ms), a Listeners Node (End-Station) needs to receive Stream 1 within 10 ms after a time point when Stream 1 is transmitted. Referring to FIG. 3, each Bridge Node reports a predetermined delay time and a link delay to the CNC server. For example, each Bridge Node may report, to the CNC server, that the delay time at each of Bridges 1, 2, 3, and 4 is 1 ms or less and the link delay is 1 ms or less. In this case, when an arrival expected time period at Bridge 1 is 1 ms, an arrival expected time period at Bridge 2 is 3 ms, and an arrival expected time period at Bridge 3 is 5 ms, and an arrival expected time period at Bridge 4 is 7 ms, Bridges 1 through 4 may report their pieces of delay time information to the CNC server. In this case, a total delay time at Bridges 1 through 4 is ms, and thus the CNC server may transmit, to each TSN nodes (Bridge Node), scheduling information indicating that Stream 1 needs to be transmitted with a predetermined delay time of ms or less. In this case, arrival at a Listener Node at 9 ms is anticipated, and thus a requirement that Stream 1 needs to be transmitted within 10 ms is satisfied.

Figure 5:
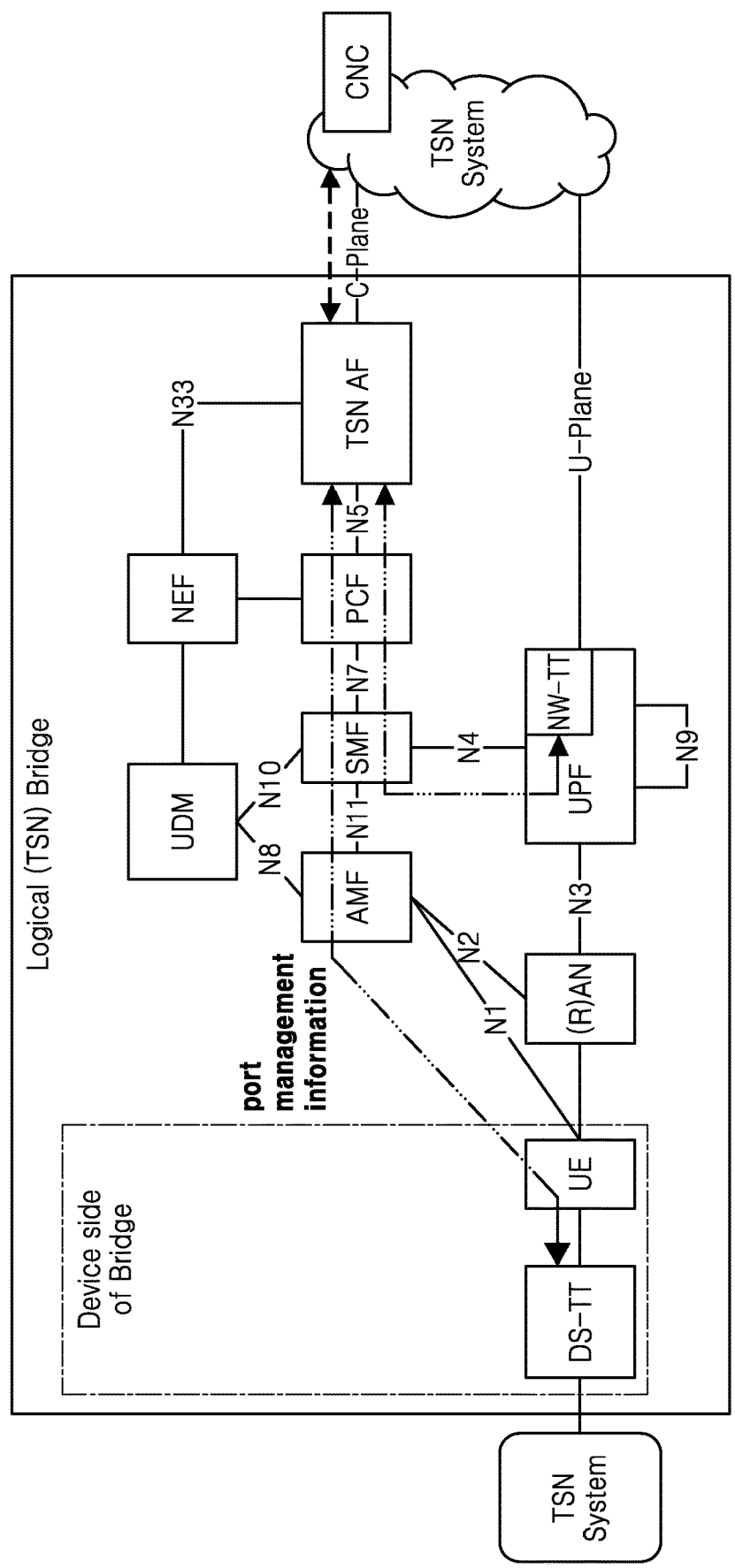
FIG. 5 illustrates a structure in which a 5G network interoperates with TSN Management, according to an embodiment of the disclosure.

FIG. 5 illustrates a structure in which the 5G network interoperates with TSN Management, according to an embodiment of the disclosure.

Connection between a UPF and external TSN may be performed by a logical function block called a Network-side TSN Translator (NW-TT), and connection between a UE and external TSN may be performed by a logical function block called a Device-Side TSN Translator (DS-TT). They may transmit information as Port within a single logical TSN Bridge as the 5G network to a TSN AF, and the TSN AF may perform Management interoperation with external TSN. When the external TSN is managed via a CNC server, the TSN AF may also interoperate with the CNC server.

Figure 6:
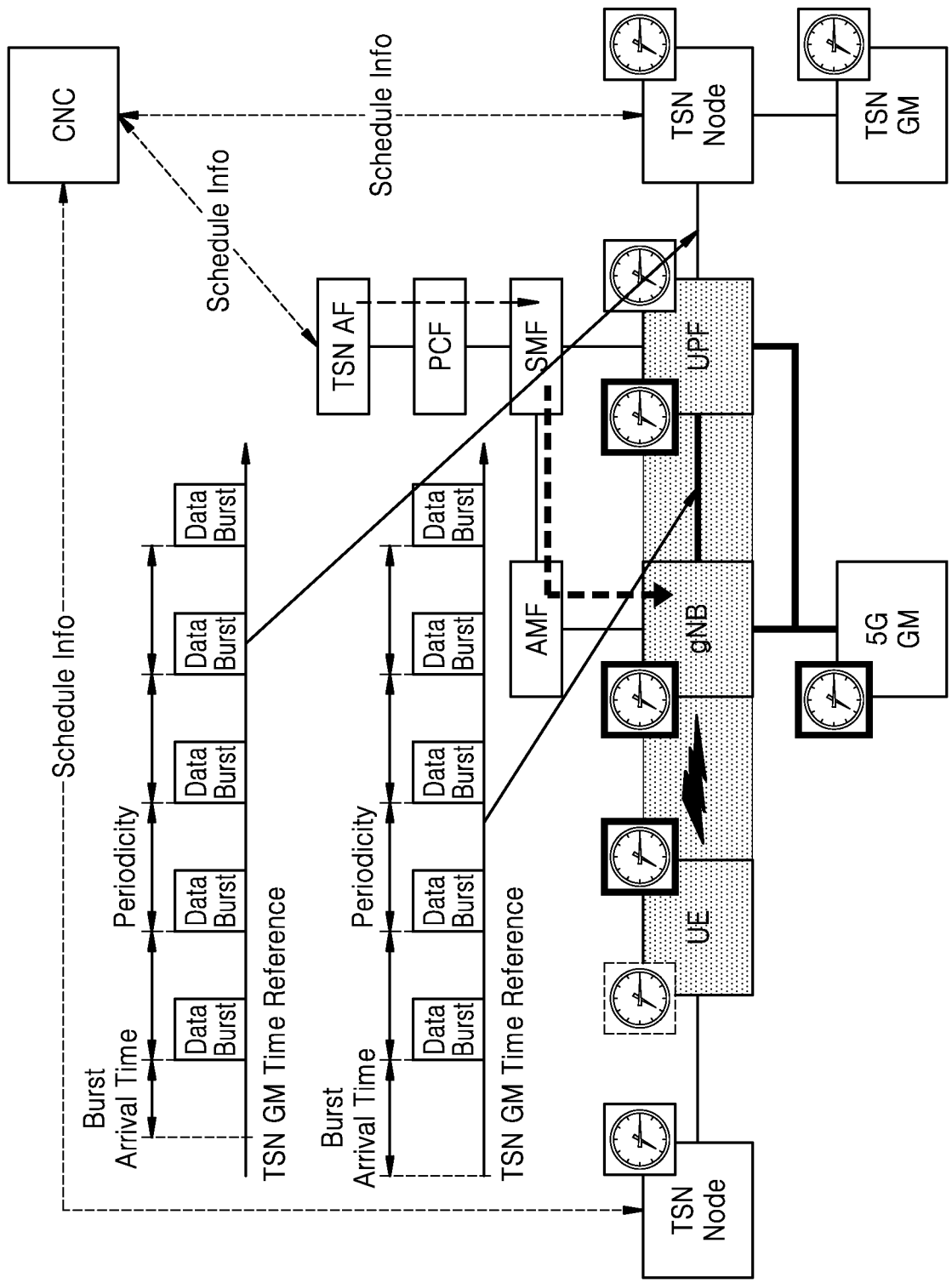
FIG. 6 illustrates a schematic diagram illustrating a method of utilizing time sensitive communication (TSC) assistance information (TSCAI), according to an embodiment of the disclosure.

FIG. 6 is a schematic diagram illustrating a method of utilizing TSC Assistance Information (TSCAI), according to an embodiment of the disclosure.

As described above with reference to FIG. 4, the CNC server may inform schedule information of each TSN node for each stream. The 5G network may receive the respective pieces of schedule information of the TSN nodes via a TSN AF. The 5G network may ascertain a period of the stream and an expected arrival time in the 5G network from the pieces of schedule information of the TSN nodes. However, because the period and the expected arrival time are written based on a TSN GM, a session management function (SMF) converts the period and the expected arrival time, based on the 5G GM. Downlink Traffic may be corrected as much correction as a Core Network Packet Delay Budget (CN-PDB) that is a maximum value of a delay time when a packet arrives at the gNB. To this end, the SMF delivers information called TSCAI to the gNB. The TSCAI includes information such as UL/DL, Periodicity, and Burst Arrival Time, from among which Burst Arrival Time is a result of reflecting CN-PDB correction and 5G GM-based time translation in schedule information of a stream received from the CNC server, as described above.

Figure 7:
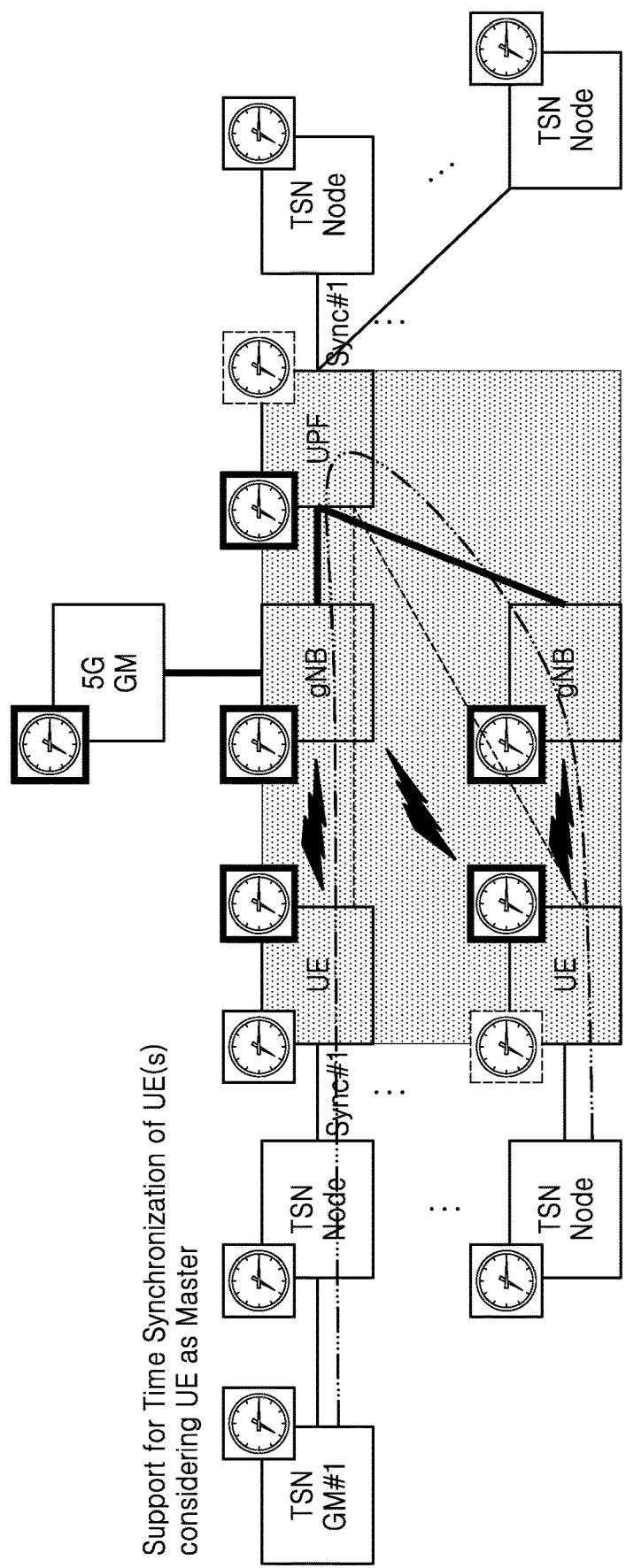
FIG. 7 illustrates an inter-UE Time Synchronization scenario when a Grand Master (GM) of a TSN exists on the side of a user equipment (UE), according to an embodiment of the disclosure.

FIG. 7 illustrates an inter-UE Time Synchronization scenario when a GM of TSN exists on the side of a UE, according to an embodiment of the disclosure.

In the related art, a scenario where a TSN GM exists on the side of an external TSN node connected to an UPF as shown in FIG. 2, and the TSN GM and a UE or the TSN GM and a TSN node connected to the UE support Time Synchronization was considered. In this case, only cases are assumed, where Time Synchronization between UEs, between a UE and external TSN nodes connected to the UE, or between external TSN nodes connected to UEs is each indirectly performed via synchronization with the TSN GM connected to the UPF. However, a case where the TSN GM is connected to a UE or a TSN node connected to the UE is also possible. For example, a case where a controller mounted on a moving vehicle controls a robot or electronic device having a position movement function is also possible. Because real-time monitoring and control of a user are important, a laptop computer or a tablet carriable by the user may serve as a GM of TSN, and thus operations of neighboring moving devices may be precisely controlled based on the laptop computer or tablet. In this case, Time Synchronization may be supported between not only UEs belonging to the same base station but also UEs belonging to different base stations.

Figure 8:
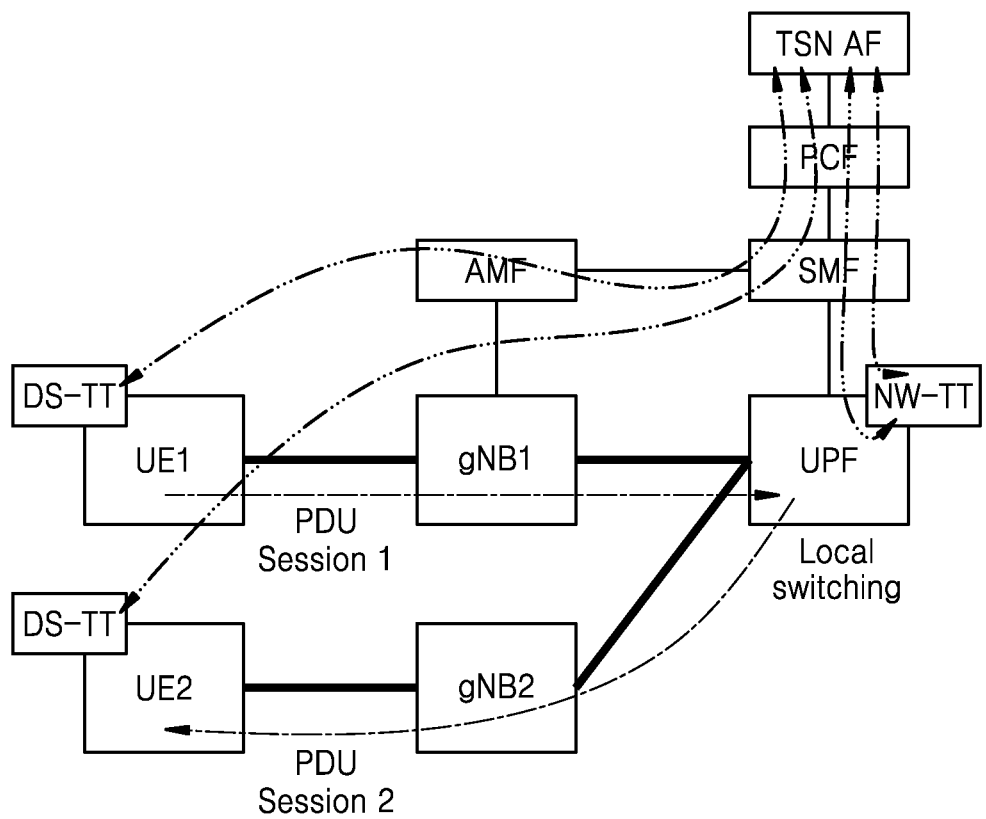
FIG. 8 illustrates a scenario in which a 5G network interoperates with TSN Management for achieving TSC support between UEs, according to an embodiment of the disclosure.

FIG. 8 illustrates a scenario in which a 5G network interoperates with TSN Management for achieving TSC support between UEs, according to an embodiment of the disclosure.

Interoperation between a 5G network and TSN Management due to the TSN AF collecting information of a NW-TT/UPF and a DS-TT/UE and exchanging the collected information with the CNC server as shown in FIG. 5 has been described above with reference to FIG. 2. In this case, an Establishment/Modification process with respect to a single PDU Session including a NW-TT/UPF and a DS-TT/UE is used. However, in such a situation as shown in FIG. 7 where a TSN GM is located on the side of a UE and thus Time Synchronization between UEs is necessary, a plurality of PDU sessions configured by connection between a UPF and a UE may be necessary. For example, because pieces of information of the NW-TT/UPF and the DS-TT/UE are collected for a single PDU session by a TSN AF in a single 5G network, two PDU Sessions are needed as shown in FIG. 8, in order to collect pieces of information for two UEs. Although two UEs exist in FIG. 8, the number of UEs is not limited thereto, and a plurality of UEs may exist.

Figure 9:
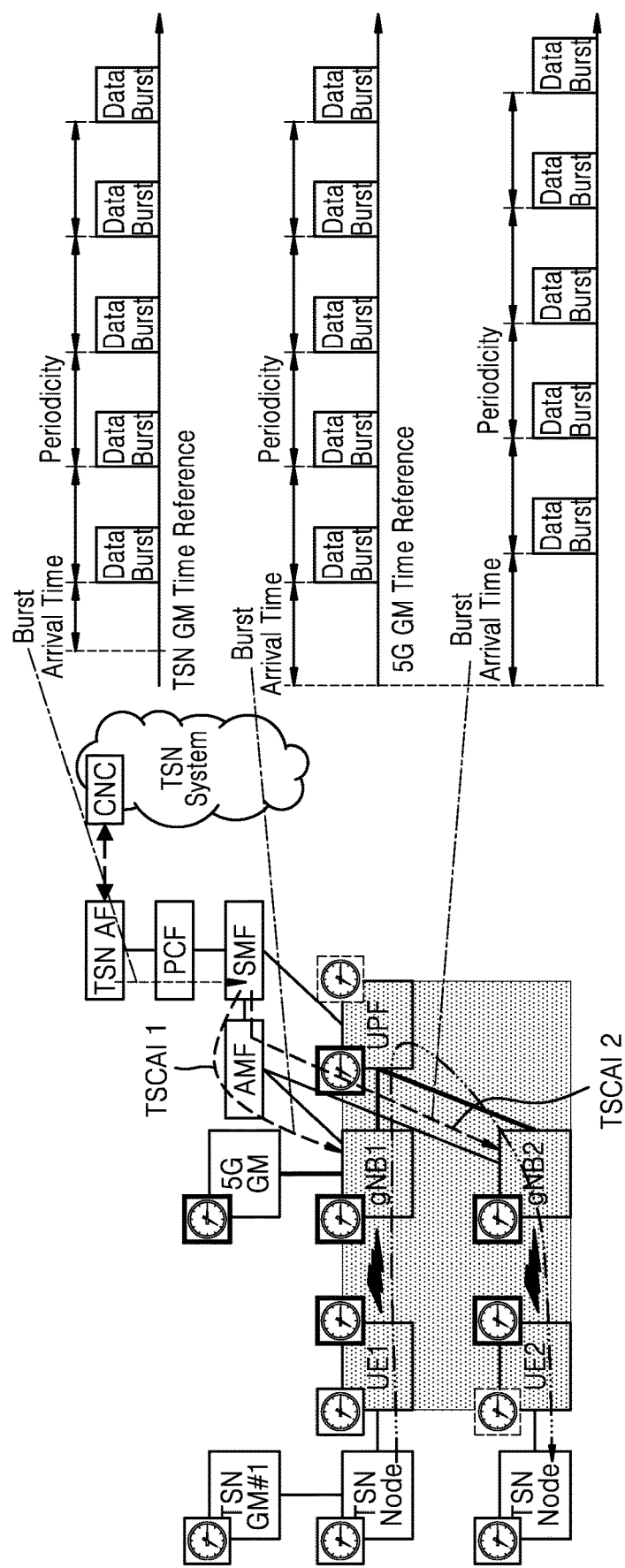
FIG. 9 illustrates a scenario in which a 5G Network utilizes TSCAI to achieve TSC support between UEs, according to an embodiment of the disclosure.

FIG. 9 illustrates a scenario in which a 5G Network utilizes TSCAI to achieve TSC support between UEs, according to an embodiment of the disclosure.

As shown in FIG. 8, a TSN AF may collect TSN-related information by using two PDU sessions. Referring to FIG. 9, collected PDU session information may interoperate with a CNC server via the TSN AF. To this end, the collected PDU session information is delivered along a path such as UE-SMF-PCF-AF or UPF-SMF-PCF-AF. Because schedule information received by the CNC server is based on the TSN GM, a writing basis of Burst Arrival Time of TSCAI reflected in gNB1 on the side of Ingress UE1 needs to change from the TSN GM to the 5G GM. The writing basis of Burst Arrival Time of TSCAI delivered to gNB2 on the side of UE2 needs to change from the TSN GM to the 5G GM, and Burst Arrival Time needs to be corrected by Uplink PDB1 and Downlink CN-PDB2, which are delay times within 5GS. Although it is clear that an SMF transmits two pieces of TSCAI, there are many choices as to when the information received from the CNC server is split into two.

Figure 10:
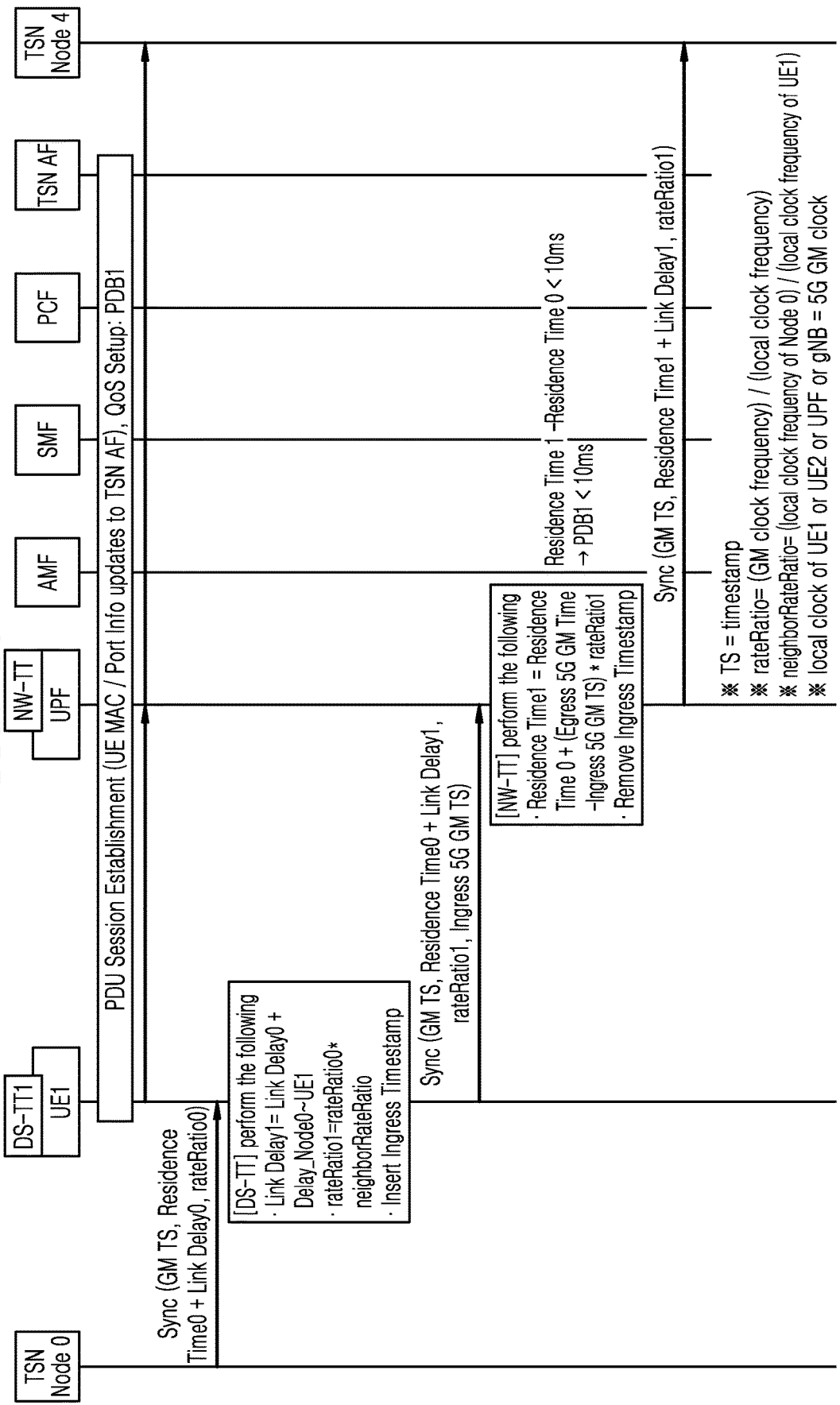
FIG. 10 illustrates a flowchart of an inter-UE Time Synchronization scenario when a TSN GM exists on the side of a UE, according to an embodiment of the disclosure.

FIG. 10 is a flowchart of an inter-UE Time Synchronization scenario when a TSN GM exists on the side of a UE, according to an embodiment of the disclosure.

When the TSN GM exists on the side of the UE as shown in FIG. 7, the UE may transmit Sync Frame toward a core network (CN) to support Time Synchronization. When DS-TT1 or UE1 receives Sync Frame from TSN Node0 as an external TSN node, DS-TT1 or UE1 records a reception time, based on the 5G GM. For convenience of explanation, UE1 performance of the above recording operation will now be described. However, DS-TT1 may perform the recording operation. When UE1 transmits Sync Frame to an UPF, UE1 may also transmit a value recorded based on the 5G GM. For example, UE1 may send reception time information by adding a special Ingress Timestamp field to Sync Frame. In addition, UE1 may periodically measure Link Delay1 as a delay time with respect to Link1 as a link with TSN Node0 as a neighboring external TSN node, calculate an average time, based on the measured delay times, and manage the calculated average time. When UE1 transmits Sync Frame to the UPF, UE1 may also transmit Link Delay1. For example, UE1 may add the value of Link Delay1 to a Correction field of Sync Frame, and transmit a result of the addition. When Link Delay1 is added to the Correction field, Link Dealy1 needs to be converted based on the TSN GM, and thus rateRatio1 may be applied. rateRatio1 is a value obtained by dividing "TSN GM Clock Frequency" by "Local Clock Frequency of UE1", and may be a value obtainable by multiplying rateRatio0 included in a rateRatio field delivered in Sync Frame by neighborRateRatio managed by UE1. rateRatio0 is a value obtained by dividing "TSN GM Clock Frequency" by "TSN Node0 Local Clock Frequency", and neighborRateRatio managed by UE1 is a value obtained by dividing "TSN Node0 Local Clock Frequency" by "Local Clock Frequency of UE1". While transmitting Sync Frame to the UPF, UE1 also transmits rateRatio1. For example, UE1 updates the value of the rateRatio field of Sync Frame with rateRatio1 and delivers a result of the updating. UE1 may set a reception time of Sync Frame as "a Correction field value including Link Delay 1 converted based on TSN GM+TSN GM", and thus may synchronize with the TSN GM.

After a NW-TT or UPF receives Sync Frame from DS-TT1 or UE1, the NW-TT or UPF calculates Residence Time as a residence time in the 5G network and thus updates the Correction field, before transmitting the received Sync Frame to TSN Node4 as an external TSN node. For convenience of explanation, UPF performance of the calculation and update operation will now be described. However, the NW-TT may perform the calculation and update operation. The UPF calculates Residence Time by subtracting an Ingress Timestamp value received from UE1, from an egress time when Sync Frame is transmitted to the outside. Before adding a Residence Time value to the Correction field, the UPF applies rateRatio1 to the Residence Time value to convert a basis from the 5G GM to the TSN GM. The UPF removes the specially-added Ingress Timestamp field before transmitting Sync Frame to the outside. The UPF may set a time point to transmit Sync Frame as "TSN GM+Correction field value", and thus may synchronize with the TSN GM.

At this time, Residence Time at a single TSN Node is unable to exceed 10 ms, and thus a QoS requirement that a sum of UE-DS-TT ResiTime1 as UL UE-DS-TT Residence Time for DS-TT1 or UE1 and PDB1 as a UL PDB of PDU Session1 is less than 10 ms needs to be applied.

Figure 11:
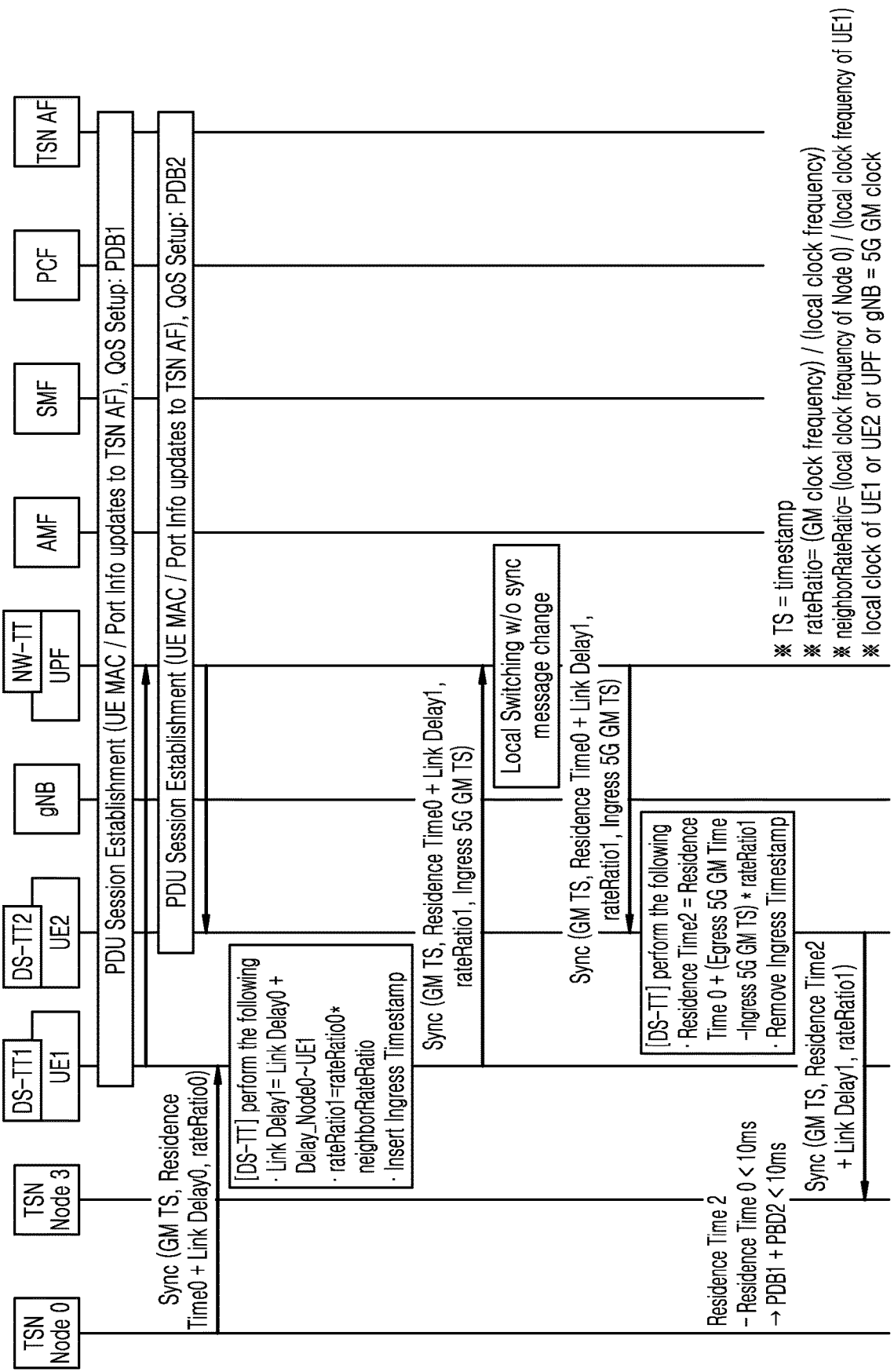
FIG. 11 illustrates a flowchart of a process of supporting inter-UE time synchronization, according to an embodiment of the disclosure.

FIG. 11 is a flowchart of a process of supporting inter-UE time synchronization, according to an embodiment of the disclosure.

Referring to FIG. 11, when the TSN GM exists on the side of a UE as shown in FIG. 7, the UE may transmit Sync Frame to another UE, and thus Time Synchronization may be supported. For convenience of explanation, UE1 or UE2 performance of the above-described Time Synchronization support will now be described. However, DS-TT1 of UE1 or DS-TT2 of UE2 may each perform the above-described Time Synchronization support. When UE1 receives Sync Frame from TSN Node0 as an external TSN node, UE1 records a reception time, based on the 5G GM. When UE1 transmits Sync Frame to an UPF, UE1 also transmits a value recorded based on the 5G GM. For example, UE1 may send reception time information by adding a special Ingress Timestamp field to Sync Frame. In addition, UE1 may periodically measure Link Delay1 as a delay time with respect to Link1 as a link with TSN Node0 as a neighboring external TSN node, calculate an average time, based on the measured delay times, and manage the calculated average time. When UE1 transmits Sync Frame to the UPF, UE1 also transmits Link Delay1. For example, UE1 may add the value of Link Delay1 to a Correction field of Sync Frame, and transmit a result of the addition. When Link Delay1 is added to the Correction field, Link Dealy1 needs to be converted based on the TSN GM, and thus rateRatio1 may be applied. rateRatio1 is a value obtained by dividing "5G Clock Frequency" by "Local Clock Frequency of UE1". While transmitting Sync Frame to the UPF, UE1 also transmits rateRatio1. For example, UE1 updates the value of a rateRatio field of Sync Frame with rateRatio1 and delivers a result of the updating. UE1 may set a reception time of Sync Frame as "a Correction field value including Link Delay 1 converted based on TSN GM+TSN GM", and thus may synchronize with the TSN GM.

The UPF processes Sync Frame via UPF-inside Local Switching between PDU Session1 and PDU Session2 and transmits the processed Sync Frame to UE2. At this time, there is no change in the contents of Sync Frame.

After UE2 receives Sync Frame from the UPF, UE2 calculates Residence Time as a residence time in the 5G network and thus updates the Correction field, before transmitting the received Sync Frame to TSN Node3 that is an external TSN node. UE2 calculates Residence Time by subtracting an Ingress Timestamp value received from UE1, from a time point when Sync Frame is transmitted to the outside. Before adding the Residence Time value to the Correction field, UE2 applies rateRatio1 to the Residence Time value to convert a basis from the 5G GM to the TSN GM. UE2 removes the specially-added Ingress Timestamp field before transmitting Sync Frame to the outside. UE2 may set a time point when Sync Frame is transmitted, as "TSN GM+Correction field value", and thus may synchronize with the TSN GM.

At this time, Residence Time at a single TSN Node is unable to exceed 10 ms, and thus a QoS requirement that a sum of UE-DS-TT ResiTime1 as UL UE-DS-TT Residence Time and PDB1 as a UL PDB and a sum of UE-DS-TT ResiTime2 as DL UE-DS-TT Residence Time and PDB2 as a DL PDB are all less than 10 ms needs to be applied. Because PDB1 is actually applied to a QoS for PDU Session1 and PDB2 is actually applied to a QoS for PDU Session2, a QoS that simultaneously takes into account the two PDU sessions is applied to deliver Sync Frame between UEs. For example, a QoS requirement that a sum of PDB1 as a UL PDB and PDB2 as a DL PDB is less than 10 ms may be converted into two QoS requirements that PDB1 needs to be less than 5 ms and PDB2 needs to be less than 5 ms, and the two QoS requirements may be applied to PDU Session1 and PDU Session2, respectively.

Figure 12:
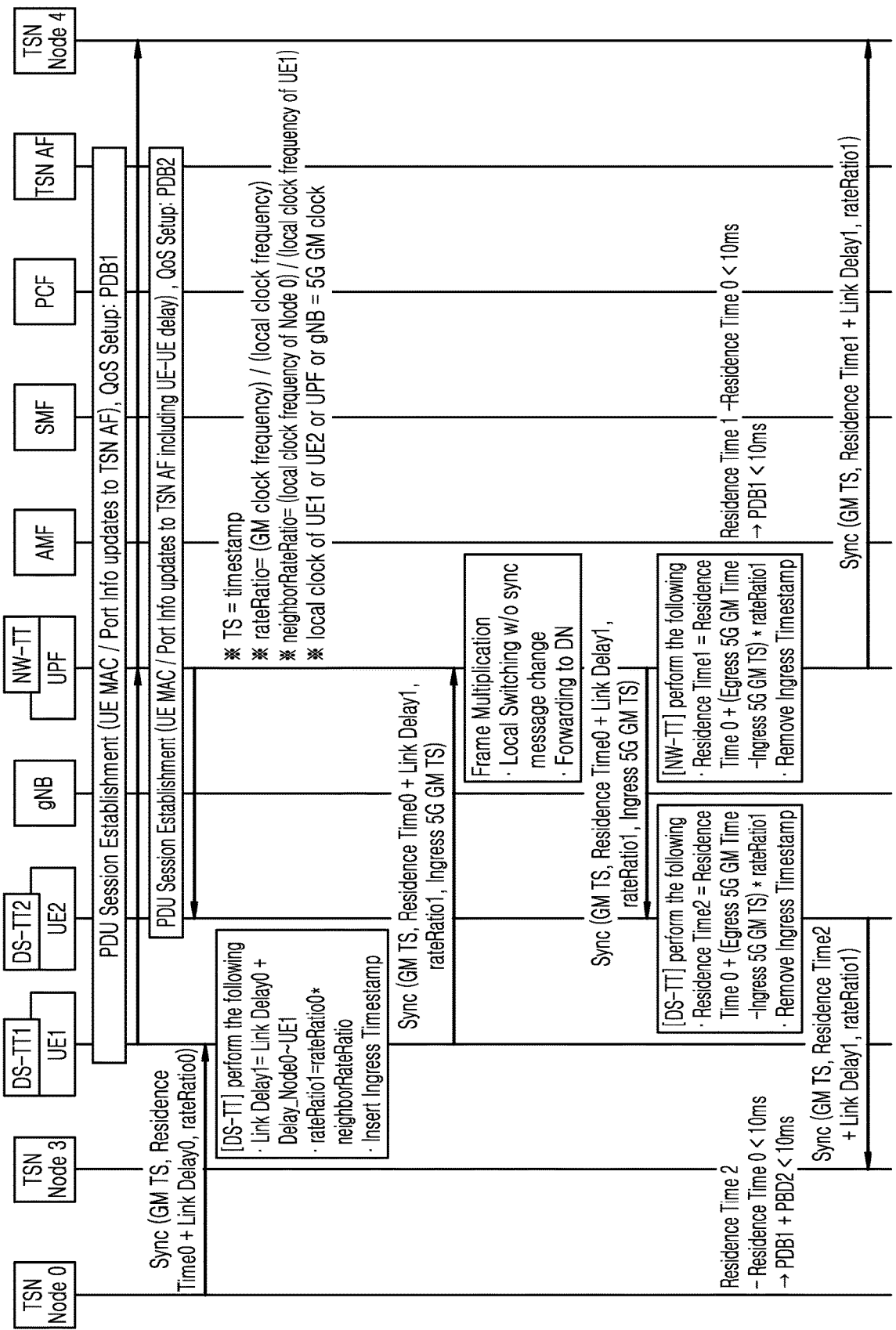
FIG. 12 illustrates a flowchart of a process of supporting time synchronization by transmitting Sync Frame in a multicast manner, according to an embodiment of the disclosure.

FIG. 12 is a flowchart of a process of supporting time synchronization by transmitting Sync Frame in a multi-cast manner, according to an embodiment of the disclosure.

In detail, referring to FIG. 12, when the TSN GM exists on the side of a UE, the UE may transmit Sync Frame to a CN or another UE in a multicast manner to thereby support Time Synchronization. At this time, the procedures described above with reference to FIGS. 10 and 11 may be applied simultaneously. For convenience of explanation, UE1 or UE2 performance of the above-described Time Synchronization support will now be described. However, DS-TT1 of UE1 or DS-TT2 of UE2 may each perform the above-described Time Synchronization support.

When UE1 receives Sync Frame from TSN Node0 as an external TSN node, UE1 records a reception time, based on the 5G GM. When UE1 transmits Sync Frame to an UPF, UE1 also transmits a value recorded based on the 5G GM. For example, UE1 may send reception time information by adding a special Ingress Timestamp field to Sync Frame. In addition, UE1 may periodically measure Link Delay1 as a delay time with respect to Link1 as a link with TSN Node0 as a neighboring external TSN node, calculate an average time, based on the measured delay times, and manage the calculated average time. When UE1 transmits Sync Frame to the UPF, UE1 may also transmit Link Delay1. For example, UE1 may add the value of Link Delay1 to a Correction field of Sync Frame, and transmit a result of the addition. When Link Delay1 is added to the Correction field, Link Dealy1 needs to be converted based on the TSN GM, and thus rateRatio1 may be applied. rateRatio1 is a value obtained by dividing "5G Clock Frequency" by "Local Clock Frequency of UE1". While transmitting Sync Frame to the UPF, UE1 may also transmit rateRatio1. For example, UE1 updates the value of a rateRatio field of Sync Frame with rateRatio1 and delivers a result of the updating. UE1 may set a reception time of Sync Frame as "a Correction field value including Link Delay 1 converted based on TSN GM+TSN GM", and thus may synchronize with the TSN GM.

The UPF applies multicast so that a single Sync Frame passes through the UPF and then a NW-TT and directly heads toward the external TSN node and another Sync Frame heads toward DS-TT2 or UE2.

After the UPF receives Sync Frame heading to the external TSN node, the UPF calculates Residence Time as a residence time in the 5G network and thus updates the Correction field, before transmitting the received Sync Frame to TSN Node4 that is an external TSN node. The UPF calculates Residence Time by subtracting an Ingress Timestamp value received from UE1, from a time point when Sync Frame is transmitted to the outside. Before adding a Residence Time value to the Correction field, the UPF applies rateRatio1 to the Residence Time value to convert a basis from the 5G GM to the TSN GM. The UPF may remove the specially-added Ingress Timestamp field before transmitting Sync Frame to the outside. The UPF may set a time point when Sync Frame is transmitted, as "TSN GM+Correction field value", and thus may synchronize with the TSN GM.

At this time, Residence Time at a single TSN Node is unable to exceed 10 ms, and thus a QoS requirement for Uplink Flow that a sum of UE-DS-TT ResiTime1 as UL UE-DS-TT Residence Time and PDB1 as a UL PDB is less than 10 ms may be applied.

After UE2 receives another Sync Frame from the UPF, UE2 calculates Residence Time as a residence time in the 5G network and thus updates the Correction field, before transmitting the received Sync Frame to TSN Node3 that is an external TSN node. UE2 calculates Residence Time by subtracting an Ingress Timestamp value received from UE1, from a time point when Sync Frame is transmitted to the outside. Before adding a Residence Time value to the Correction field, UE2 applies rateRatio1 to the Residence Time value to convert a basis from the 5G GM to the TSN GM. UE2 may remove the specially-added Ingress Timestamp field before transmitting Sync Frame to the outside. UE2 may set a time point when Sync Frame has been transmitted, as "TSN GM+Correction field value", and thus may synchronize with the TSN GM.

At this time, Residence Time at a single TSN Node is unable to exceed 10 ms, and thus a QoS requirement that a sum of UE-DS-TT ResiTime1 as UL UE-DS-TT Residence Time and PDB1 as a UL PDB and a sum of UE-DS-TT ResiTime2 as DL UE-DS-TT Residence Time and PDB2 as a DL PDB are all less than 10 ms may be applied.

Because PDB1 is actually applied to a QoS for PDU Session1 and PDB2 is actually applied to a QoS for PDU Session2, a QoS that simultaneously takes into account the two PDU sessions is applied to deliver Sync Frame between UEs. For example, a QoS requirement that a sum of PDB1 as a UL PDB and PDB2 as a DL PDB is less than 10 ms may be converted into two QoS requirements that PDB1 needs to be less than 5 ms and PDB2 needs to be less than 5 ms, and the two QoS requirements may be applied to PDU Session1 and PDU Session2, respectively.

The newly calculated requirements are stricter than the previously calculated requirement that the sum of PDB1 and PDB2 is less than 10 ms, and thus need to be satisfied for simultaneous satisfaction.

Figure 13:
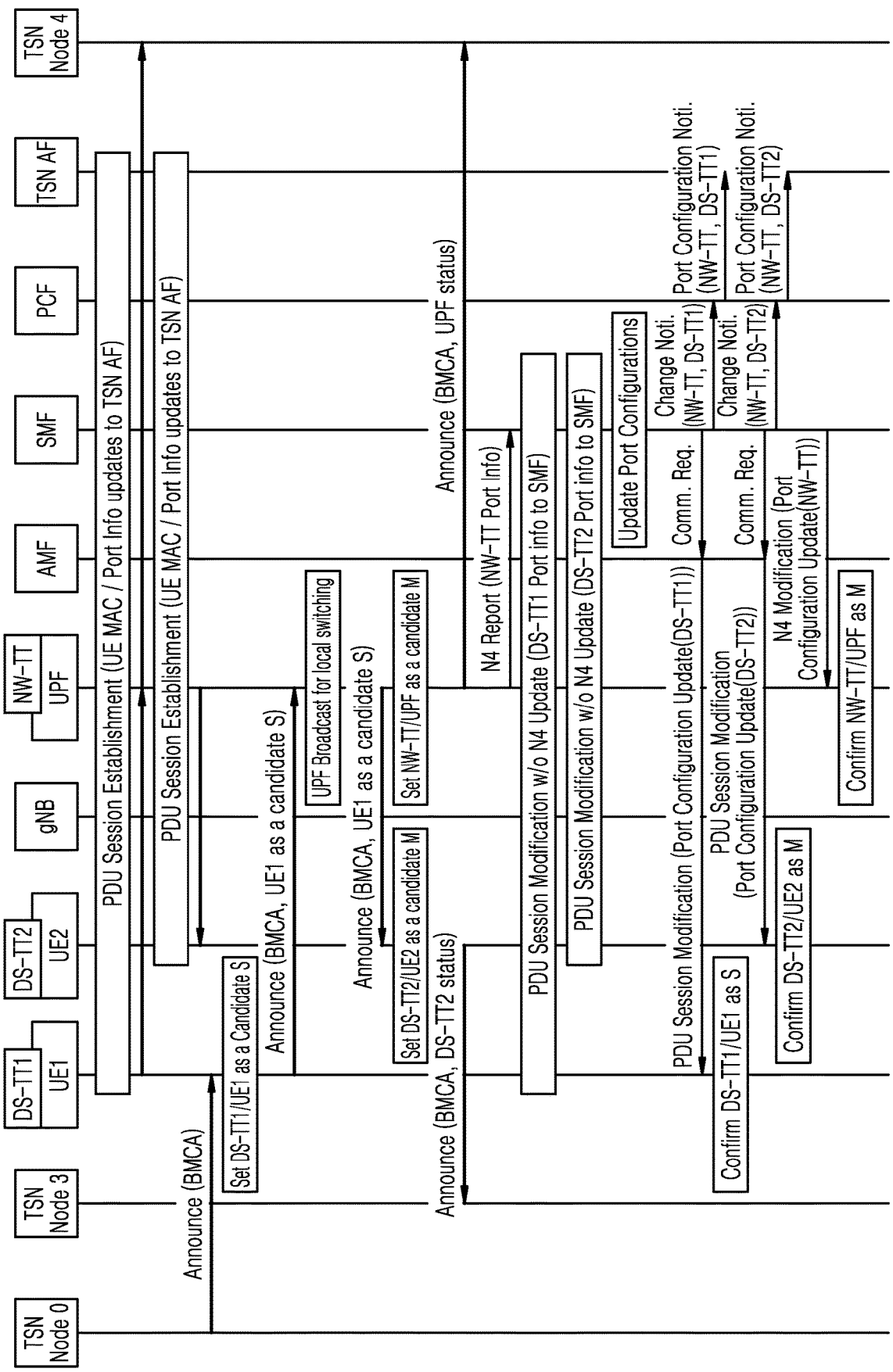
FIG. 13 illustrates a flowchart of a process in which, when a GM of TSN exists on the side of a UE, a session management function (SMF) performs a Best Master Clock Algorithm (BMCA) by managing information, according to an embodiment of the disclosure.

FIG. 13 is a flowchart of a process in which, when a GM of TSN exists on the side of a UE, an SMF performs a Best Master Clock Algorithm (BMCA) by managing information, according to an embodiment of the disclosure.

In detail, referring to FIG. 13, when the GM of TSN exists on the side of the UE, the SMF may comprehensively manage information and thus the BMCA may be performed. As described above with reference to FIG. 9, interoperation between a 5G network and TSN Management may be achieved via a TSN AF by considering the 5G network as a single TSN Bridge. In the 5G network, information about PDU Session1 related with UE1 and information about PDU Session2 related with UE2 may be separately managed. For example, to form a Tree via which Sync Frame is delivered, when a BMCA is performed for each TSN Clock Domain, a process of synthesizing information of PDU Session1 and information of PDU Session2 may be needed. The BMCA is an algorithm for determining what TSN Node is determined as a Grand Master, and a Port having received an Announcement Message from a node close to the Grand Master expresses its own state as a Slave (S) state. Because it is possible for only one Port to have an S state within one bridge, when several Ports are candidates for an S state, information within the bridge is synthesized, and thus only one Port from among the candidates is determined to have an S state. A 5G Logical Bridge also participates in the BMCA by serving as one bridge, and a UE or DS-TT and a UPF or NW-TT participate in the BMCA by serving as a single Port of the 5G Logical Bridge. A TSN GM may be set for each Work Clock Domain. When TSN is in an S state, this may mean that TSN has a lower priority to be designated as the Grand Master, than when TSN is in a Master (M) state. For convenience of explanation, DS-TT1 or UE1, DS-TT2 or UE2, and an NW-TT or UPF corresponding to DS-TT1/UE1, DS-TT2/UE2, and NW-TT/UPF, respectively, will now be described.

When TSN Node0 as an external TSN node receives Announcement Frame, DS-TT/UE1 sets its own Port as a provisional S state and transmits Announcement Frame to the UPF. The UPF broadcasts Announcement Frame to other ports within a Logical TSN Bridge of the 5G network. In other words, one Announcement Frame may pass through the NW-TT and head toward an external TSN node, and the UPF may make another Announcement Frame undergo Local Switching within the UPF and head toward DS-TT2/UE2.

In response to the Announcement Frame, the NW-TT sets its own Port in an M state, and transmits the Announcement Frame to TSN Node4 as an external TSN node. Likewise, in response to the Announcement Frame received from DS-TT1/UE1 via the UPF, DS-TT2/UE2 provisionally sets its own Port in an M state, and transmits the Announcement Frame to TSN Node3 as an external TSN node.

After passing through a process of delivering these Announcement Frames, DS-TT1/UE1, DS-TT2/UE2, and the NW-TT/UPF updates the SMF with information of the Ports via a PDU Session Modification procedure. A UE enabling Data communication by passing through a UPF is referred to as a PDU Session, and a process of changing information of the PDU Session is a PDU Session Modification procedure. In PDU Session Modification, the DS-TT1/UE1 and the NW-TT/UPF delivers information about PDU Session1 and the DS-TT2/UE2 or the NW-TT/UPF delivers information about PDU Session2, but the SMF may manage the information about PDU Session1 and the information about PDU Session2 by knowing that PDU Session1 and PDU Session2 belong to the same TSN Management. The SMF may classify information to be comprehensively managed, by utilizing the fact that PDU Session1 and PDU Session2 having the same TSN Logical Bridge ID and the same TSN Working Clock Domain ID. After the SMF determines final Port Configuration information that is to be actually reflected, based on synthesized Port information, the SMF transmits the final Port Configuration information to DS-TT1/UE1, DS-TT2/UE2, and NW-TT/UPF by using a PDU Session Modification procedure and an N4 Update procedure with respect to PDU Session1 and PDU Session2. The determined final Port Configuration information is also reflected in a Policy Control Function (PCF) and a TSN AF via a Notification procedure.

Figure 14:
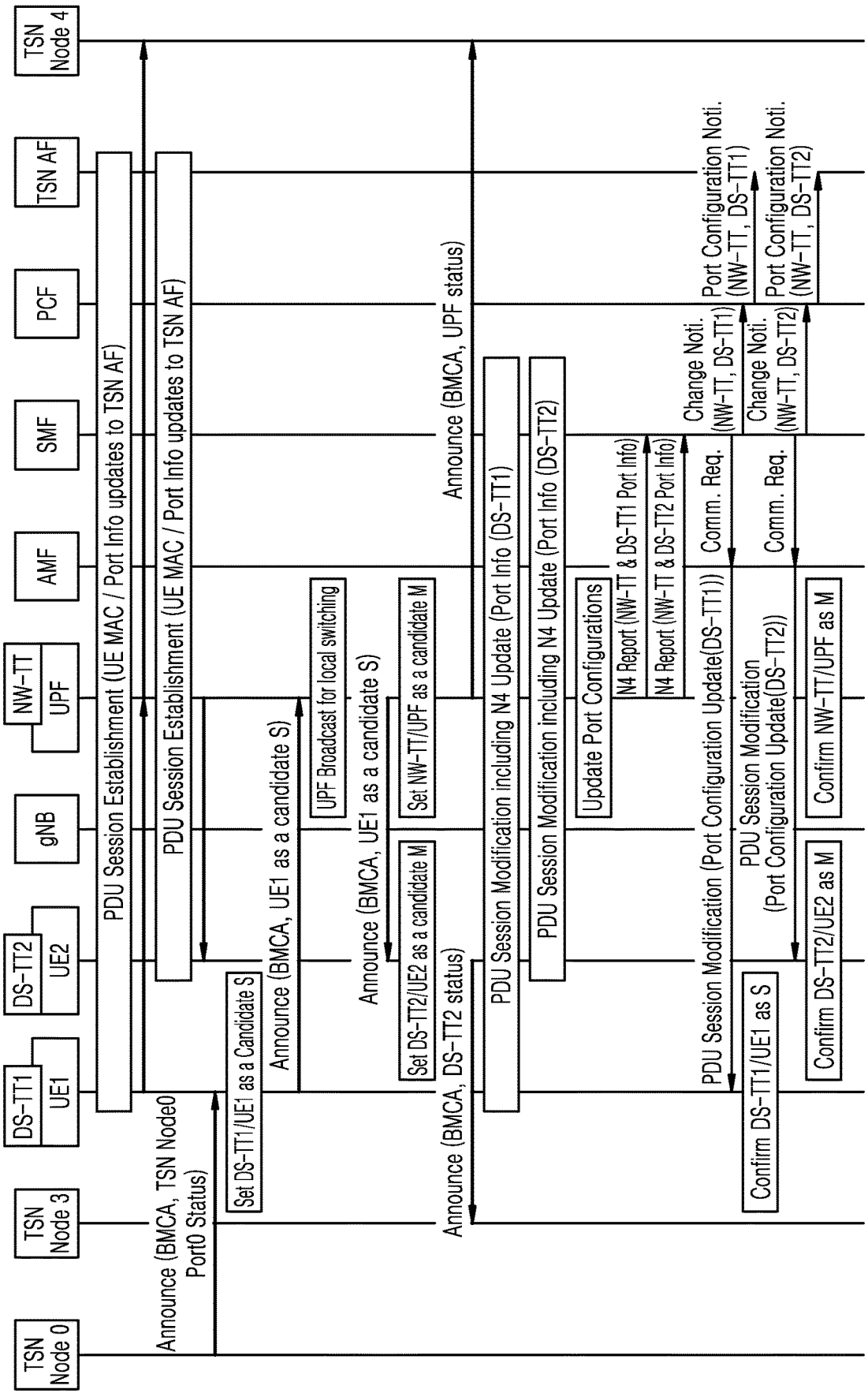
FIG. 14 illustrates a flowchart of a process in which, when a GM of TSN exists on the side of a UE, a user plane function (UPF) performs a BMCA by managing information, according to an embodiment of the disclosure.

FIG. 14 is a flowchart of a process in which, when a GM of TSN exists on the side of a UE, a UPF performs a BMCA by managing information, according to an embodiment of the disclosure.

In detail, referring to FIG. 14, as described above with reference to FIG. 9, interoperation between a 5G network and TSN Management may be achieved via an TSN AF by considering the 5G network as a single TSN Bridge. In the 5G network, information about PDU Session1 related with UE1 and information about PDU Session2 related with UE2 may be separately managed. For example, to form a Tree via which Sync Frame is delivered, when a BMCA is performed for each TSN Clock Domain, a process of synthesizing information of PDU Session1 and information of PDU Session2 may be needed. When TSN Node0 as an external TSN node receives Announcement Frame, DS-TT1/UE1 sets its own Port as a provisional S state and transmits Announcement Frame to the UPF. The UPF may broadcast Announcement Frame to other ports within a Logical TSN Bridge of the 5G network. In this example, one Announcement Frame may pass through a NW-TT and head toward an external TSN node, and the UPF may make another Announcement Frame undergo Local Switching within the UPF and head toward DS-TT2/UE2.

In response to the Announcement Frame, the NW-TT provisionally sets its own Port in an M state, and transmits the Announcement Frame to TSN Node4 as an external TSN node. Likewise, in response to the Announcement Frame received from DS-TT1/UE1 via the UPF, DS-TT2/UE2 provisionally sets its own Port in an M state, and transmits the Announcement Frame to TSN Node3 as an external TSN node.

After passing through such a process of delivering the Announcement Frames, DS-TT1/UE1 and DS-TT2/UE2 may update an SMF with information of the Ports via a PDU Session Modification procedure, and the SMF delivers the information to the UPF via an N4 update procedure. In PDU Session Modification, the DS-TT1/UE1 and the NW-TT/ UPF delivers information about PDU Session1 and the DS-TT2/UE2 or the NW-TT/UPF delivers information about PDU Session2, but the UPF may manage the information about PDU Session1 and the information about PDU Session2 by knowing that PDU Session1 and PDU Session2 belong to the same TSN Management. The UPF may classify information to be comprehensively managed, by utilizing the fact that PDU Session1 and PDU Session2 having the same TSN Logical Bridge ID and the same TSN Working Clock Domain ID. After the UPF determines final Port Configuration information that is to be actually reflected, based on synthesized Port information, the UPF transmits the final Port Configuration information to DS-TT1/UE1 and DS-TT2/UE2 by using an N4 Update procedure and a PDU Session Modification procedure with respect to PDU Session1 and PDU Session2. In addition, the UPF may update a configuration of the NW-TT or UPF according to the final Port Configuration information. The determined final Port Configuration information is also reflected in a PCF and a TSN AF via a Notification procedure.

Figure 15:
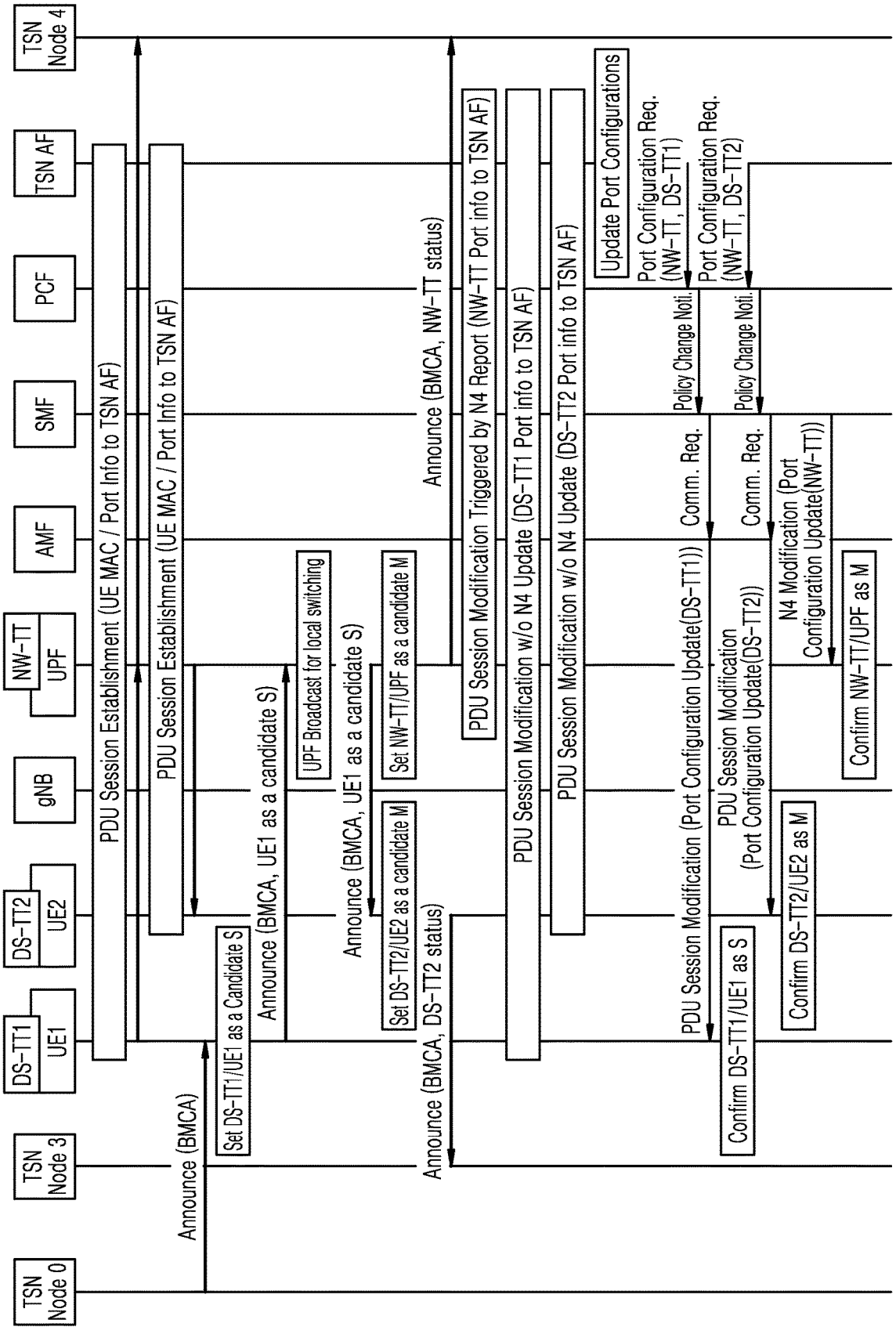
FIG. 15 illustrates a flowchart of a process in which, when a GM of TSN exists on the side of a UE, a time sensitive network (TSN) application function (AF) performs a BMCA by managing information, according to an embodiment of the disclosure.

FIG. 15 is a flowchart of a process in which, when a GM of TSN exists on the side of a UE, a TSN AF performs a BMCA by managing information, according to an embodiment of the disclosure.

As described above with reference to FIG. 9, interoperation between a 5G network and TSN Management may be achieved via the TSN AF by considering the 5G network as a single TSN Bridge. In the 5G network, information about PDU Session1 related with UE1 and information about PDU Session2 related with UE2 may be separately managed. For example, to form a Tree via which Sync Frame is delivered, when a BMCA is performed for each TSN Clock Domain, a process of synthesizing information of PDU Session1 and information of PDU Session2 may be needed. When TSN Node0 as an external TSN node receives Announcement Frame, DS-TT1/UE1 sets its own Port as a provisional S state and transmits Announcement Frame to a UPF. The UPF broadcasts Announcement Frame to other ports within a Logical TSN Bridge of the 5G network. In other words, one Announcement Frame may pass through an NW-TT and head toward an external TSN node, and the UPF may make another Announcement Frame undergo Local Switching within the UPF and head toward DS-TT2/UE2.

In response to the Announcement Frame, the NW-TT provisionally sets its own Port in an M state, and transmits the Announcement Frame to TSN Node4 as an external TSN node. Likewise, in response to the Announcement Frame received from DS-TT1/UE1 via the UPF, DS-TT2/UE2 provisionally sets its own Port in an M state, and transmits the Announcement Frame to TSN Node3 as an external TSN node.

After passing through a process of delivering these Announcement Frames, DS-TT1/UE 1, DS-TT2/UE2, and the NW-TT/UPF updates the TSN AF with information of the Ports via a PDU Session Modification procedure. In PDU Session Modification, the DS-TT1/UE1 and the NW-TT/UPF delivers information about PDU Session1 and the DS-TT2/UE2 or the NW-TT/UPF delivers information about PDU Session2, but the TSN AF may manage the information about PDU Session1 and the information about PDU Session2 by knowing that PDU Session1 and PDU Session2 belong to the same TSN Management. The TSN AF may classify information to be comprehensively managed, by utilizing the fact that PDU Session1 and PDU Session2 having the same TSN Logical Bridge ID and the same TSN Working Clock Domain ID. After the TSN AF determines final Port Configuration information that is to be actually reflected, based on synthesized Port information, the TSN AF transmits the final Port Configuration information to DS-TT1/UE1, DS-TT2/UE2, and NW-TT/UPF by using a PDU Session Modification procedure and an N4 Update procedure with respect to PDU Session1 and PDU Session2. The determined final Port Configuration information is also reflected in a PCF via a Notification procedure.

Figure 16:
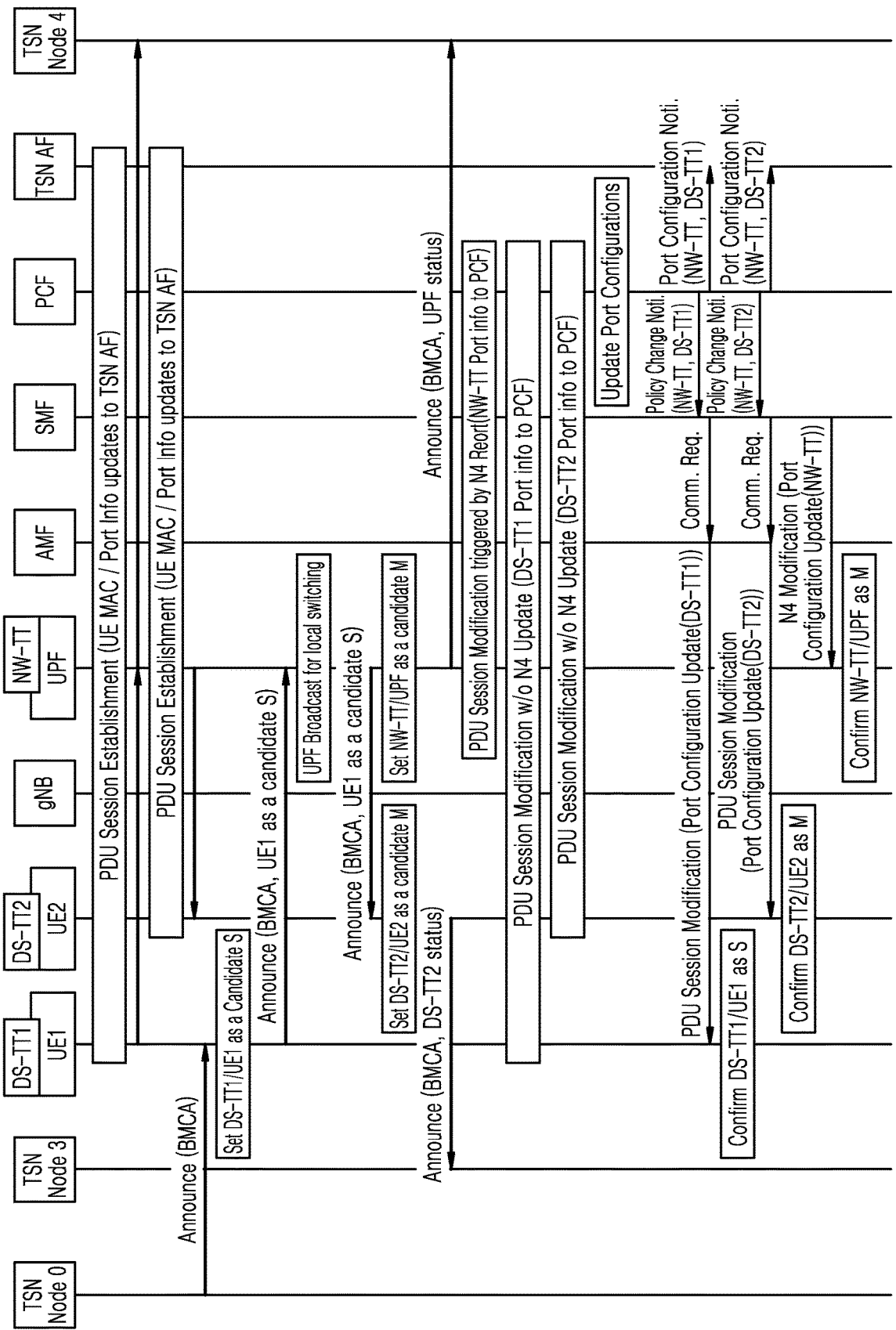
FIG. 16 illustrates a flowchart of a process in which, when a GM of a TSN exists on the side of a UE, a policy control function (PCF) performs a BMCA by managing information, according to an embodiment of the disclosure.

FIG. 16 is a flowchart of a process in which, when a GM of TSN exists on the side of a UE, a PCF performs a BMCA by managing information, according to an embodiment of the disclosure.

In detail, referring to FIG. 16, as described above with reference to FIG. 9, interoperation between a 5G network and TSN Management may be achieved via a TSN AF by considering the 5G network as a single TSN Bridge. In the 5G network, information about PDU Session1 related with UE1 and information about PDU Session2 related with UE2 may be separately managed. For example, to form a Tree via which Sync Frame is delivered, when a BMCA is performed for each TSN Clock Domain, a process of synthesizing information of PDU Session1 and information of PDU Session2 may be needed. When TSN Node0 as an external TSN node receives Announcement Frame, DS-TT1/UE1 sets its own Port as a provisional S state and transmits Announcement Frame to a UPF. The UPF broadcasts Announcement Frame to other ports within a Logical TSN Bridge of the 5G network. In this example, one Announcement Frame may pass through an NW-TT and head toward an external TSN node, and the UPF may make another Announcement Frame undergo Local Switching within the UPF and head toward DS-TT2/UE2.

In response to the Announcement Frame, the NW-TT provisionally sets its own Port in an M state, and transmits the Announcement Frame to TSN Node4 as an external TSN node. Likewise, in response to the Announcement Frame received from DS-TT1/UE1 via the UPF, DS-TT2/UE2 provisionally sets its own Port in an M state, and transmits the Announcement Frame to TSN Node3 as an external TSN node.

After passing through a process of delivering these Announcement Frames, DS-TT1/UE1, DS-TT2/UE2, and the NW-TT/UPF updates the PCF with information of the Ports via a PDU Session Modification procedure. In PDU Session Modification, the DS-TT1/UE1 and the NW-TT/UPF delivers information about PDU Session1 and the DS-TT2/UE2 or the NW-TT/UPF delivers information about PDU Session2, but the PCF may manage the information about PDU Session1 and the information about PDU Session2 by knowing that PDU Session1 and PDU Session2 belong to the same TSN Management. The PCF classifies information to be comprehensively managed, by utilizing the fact that PDU Session1 and PDU Session2 having the same TSN Logical Bridge ID and the same TSN Working Clock Domain ID. After the PCF determines final Port Configuration information that is to be actually reflected, based on synthesized Port information, the PCF transmits the final Port Configuration information to DS-TT1/UE1, DS-TT2/UE2, and NW-TT/UPF by using a PDU Session Modification procedure and an N4 Update procedure with respect to PDU Session1 and PDU Session2. The determined final Port Configuration information is also reflected in a TSN AF via a Notification procedure.

Figure 17:
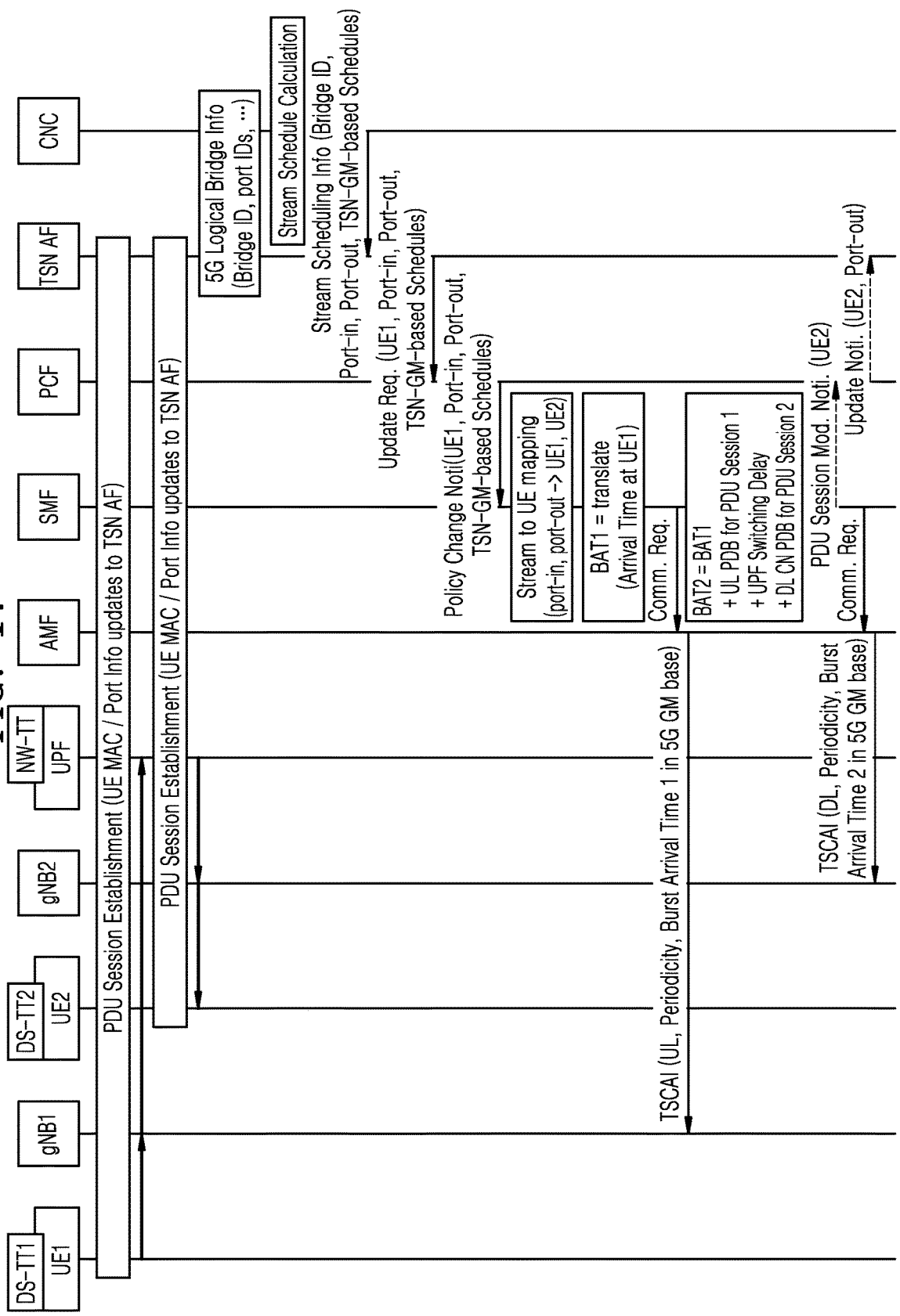
FIG. 17 illustrates a flowchart of a process in which an SMF applies TSCAI to a 3rd Generation Partnership Project (3GPP) network by managing information in order to support TSC from a UE to another UE, according to an embodiment of the disclosure.

FIG. 17 is a flowchart of a process in which an SMF applies TSCAI to a 3GPP network by managing information in order to support TSC from a UE to another UE, according to an embodiment of the disclosure.

A CNC server may obtain Configuration information for each Port of a 5G network via a TSN AF. Because the Configuration information for each Port includes information of neighboring ports for each port, the CNC server may ascertain a Port through which Stream is to pass, between a Talker and a Listener as End-Stations. Because the Configuration information for each Port includes a Scheduling capability of each TSN node or TSN Bridge, the CNC server may determine Schedule information of Stream for each Port between Talker and Listener, and inform the determined Schedule information. The CNC server delivers the Schedule information of Stream for each Port to the 5G network via the TSN AF. The Stream Schedule information is delivered from the TSN AF to the SMF via a PCF. When the Stream Schedule information is delivered from the TSN AF via the PCF, the Stream Schedule information is delivered to a thing related with a PDU Session for one of DS-TT1/UE1 and DS-TT2/UE2. For example, the Stream Schedule information may be delivered to a PCF and an SMF that correspond to selected PDU Session1 corresponding to DS-TT1/UE1.

The SMF converts Burst Arrival Time1 (BAT1) of TSCAI corresponding to DS-TT1/UE1 into 5G GM reference information, based on the TSN GM, and delivers the 5G GM reference information to a gNB via a PDU Session Modification procedure. Simultaneously, the SMF calculates BAT2 of TSCAI corresponding to DS-TT2/UE2. BAT2 is calculated by adding Uplink PDB of PDU Session1, Local Switching Delay in a UPF, and Downlink CN-PDB of PDU Session2 to BAT1. The SMF delivers BAT2 to the gNB via a process of updating only a RAN Parameter during a PDU Session Modification procedure with respect to PDU Session2. In addition, the SMF may inform the PCF and the TSN AF that the corresponding Scheduling Information has been delivered to the gNB, through Notification for PDU Session2.

Figure 18:
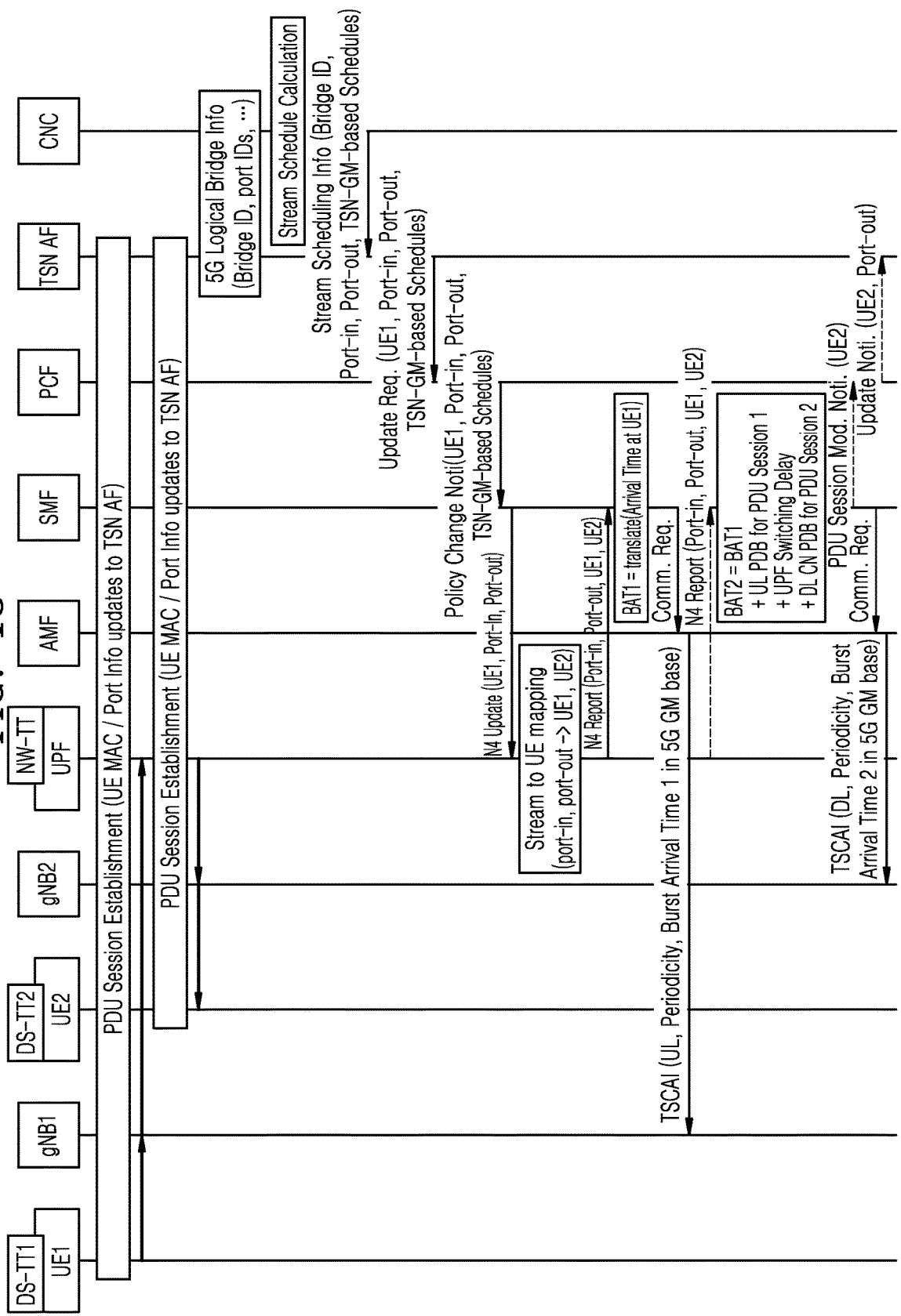
FIG. 18 illustrates a flowchart of a process in which a UPF applies TSCAI to a 3GPP network by managing information in order to support TSC from a UE to another UE, according to an embodiment of the disclosure.

FIG. 18 is a flowchart of a process in which a UPF applies TSCAI to a 3GPP network by managing information in order to support TSC from a UE to another UE, according to an embodiment of the disclosure.

A CNC server ascertains Configuration information for each Port of a 5G network via a TSN AF. Because the Configuration information for each Port includes information of neighboring ports for each port, the CNC server may ascertain a Port through which Stream is to pass, between a Talker and a Listener. Because the Configuration information for each Port includes a Scheduling capability of each TSN node or TSN Bridge, the CNC server may determine Schedule information of Stream for each Port between Talker and Listener, and inform the determined Schedule information. The CNC server delivers the Stream Schedule information to the 5G network via the TSN AF. The Stream Schedule information is delivered from the TSN AF to an SMF via a PCF.

When the Stream Schedule information is delivered from the TSN AF via the PCF, the Stream Schedule information is delivered to a thing related with a PDU Session for one of DS-TT1/UE1 and DS-TT2/UE2. For example, a PDU Session corresponding to DS-TT1/UE1 may be selected, and the Stream Schedule information may be delivered to a PCF and an SMF that correspond to the selected PDU Session. The SMF again updates the UPF with the Stream Schedule information via N4. The UPF maps DS-TT1/UE1 and DS-TT2/UE2 in Port-in information and Port-out information and delivers information of the mapping to the SMF via N4 Report. At this time, the UPF may individually deliver N4 Report corresponding to DS-TT1/UE1 and N4 Report corresponding to DS-TT2/UE2 to the SMF.

The SMF converts BAT1 of TSCAI corresponding to DS-TT1/UE1 into 5G GM reference information, based on the TSN GM, and delivers the 5G GM reference information to a gNB via a PDU Session Modification procedure. Simultaneously, the SMF calculates BAT2 of TSCAI corresponding to DS-TT2/UE2. BAT2 is calculated by adding Uplink PDB of PDU Session1, Local Switching Delay in a UPF, and Downlink CN-PDB of PDU Session2 to BAT1. The SMF delivers BAT2 to the gNB via a process of updating only a RAN Parameter during a PDU Session Modification procedure with respect to PDU Session2. In addition, the SMF may inform the PCF and the TSN AF that the corresponding Scheduling Information has been delivered to the gNB, through Notification for PDU Session2.

Figure 19A:
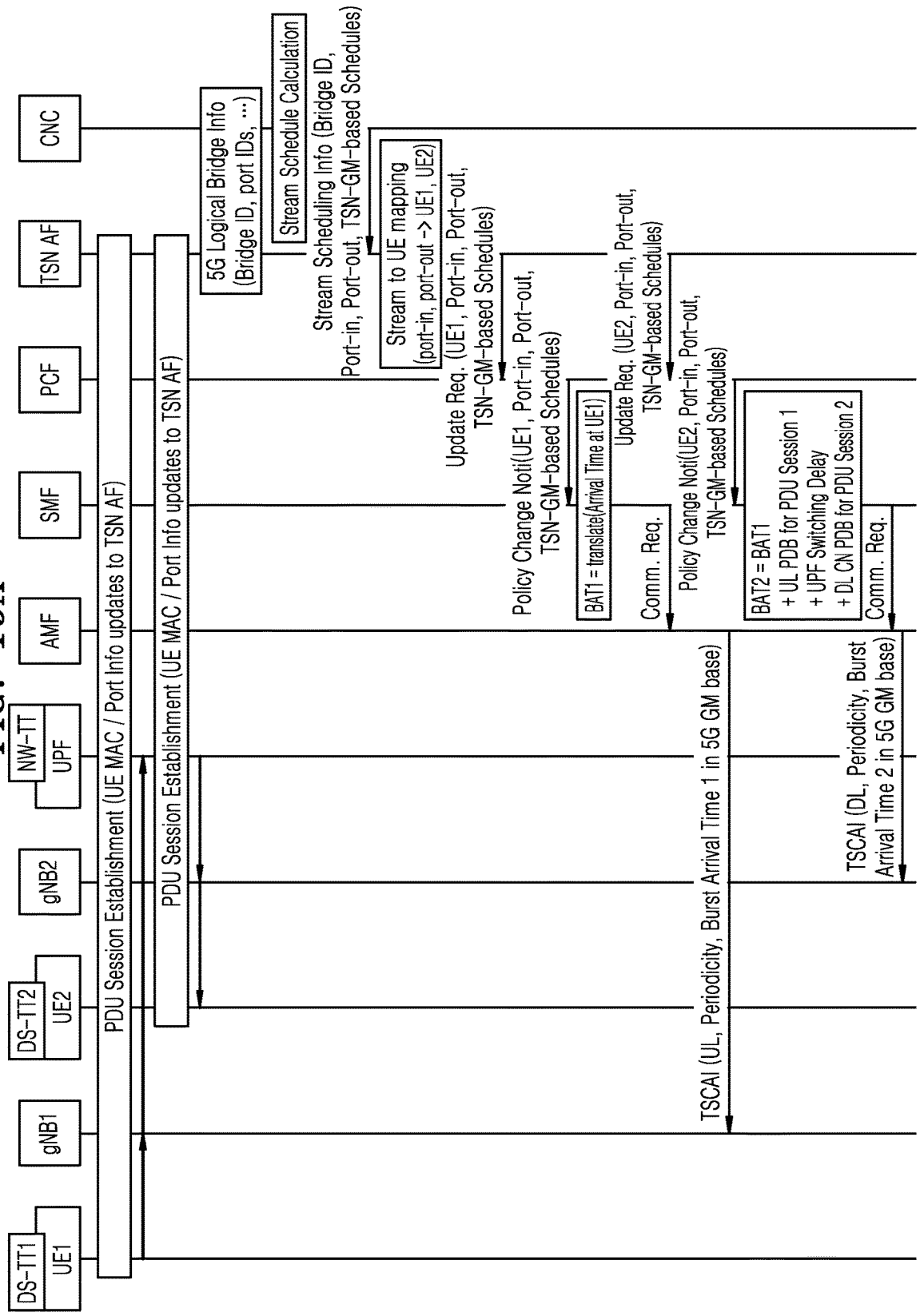
FIG. 19A illustrates a flowchart of a process in which a TSN AF applies TSCAI to a 3GPP network by managing information in order to support TSC from a UE to another UE, according to an embodiment of the disclosure.

FIG. 19A is a flowchart of a process in which a TSN AF applies TSCAI to a 3GPP network by managing information in order to support TSC from a UE to another UE, according to an embodiment of the disclosure.

A CNC server ascertains Configuration information for each Port of a 5G network via the TSN AF. Because the Configuration information for each Port includes information of neighboring ports for each port, the CNC server may ascertain a Port through which Stream is to pass, between a Talker and a Listener. Because the Configuration information for each Port includes a Scheduling capability of each TSN node or TSN Bridge, the CNC server may determine Schedule information of Stream for each Port between Talker and Listener, and inform the determined Schedule information. The CNC server delivers the Stream Schedule information to the 5G network via the TSN AF. The Stream Schedule information is delivered from the TSN AF to an SMF via a PCF. The TSN AF finds DS-TT1/UE1 and DS-TT2/UE2 corresponding to Port-in and Port-out, and delivers the Stream Schedule information to a PCF and an SMF that correspond to each of PDU Session1 and PDU Session2 respectively corresponding to DS-TT1/UE1 and DS-TT2/UE2. The PCF may be different or the same for each PDU session. The SMF may be different or the same for each PDU session.

In response to information for PDU Sesion1, the SMF converts BAT1 of TSCAI corresponding to DS-TT1/UE1 into 5G GM reference information, based on the TSN GM, and delivers the 5G GM reference information to a gNB via a PDU Session Modification procedure. In response to information for PDU Sesion2, the SMF calculates BAT2 of TSCAI corresponding to DS-TT2/UE2. BAT2 is calculated by adding Uplink PDB of PDU Session1, Local Switching Delay in a UPF, and Downlink CN-PDB of PDU Session2 to BAT1. The SMF delivers BAT2 to the gNB via a process of updating only a RAN Parameter during a PDU Session Modification procedure corresponding to PDU Session2.

Figure 19B:
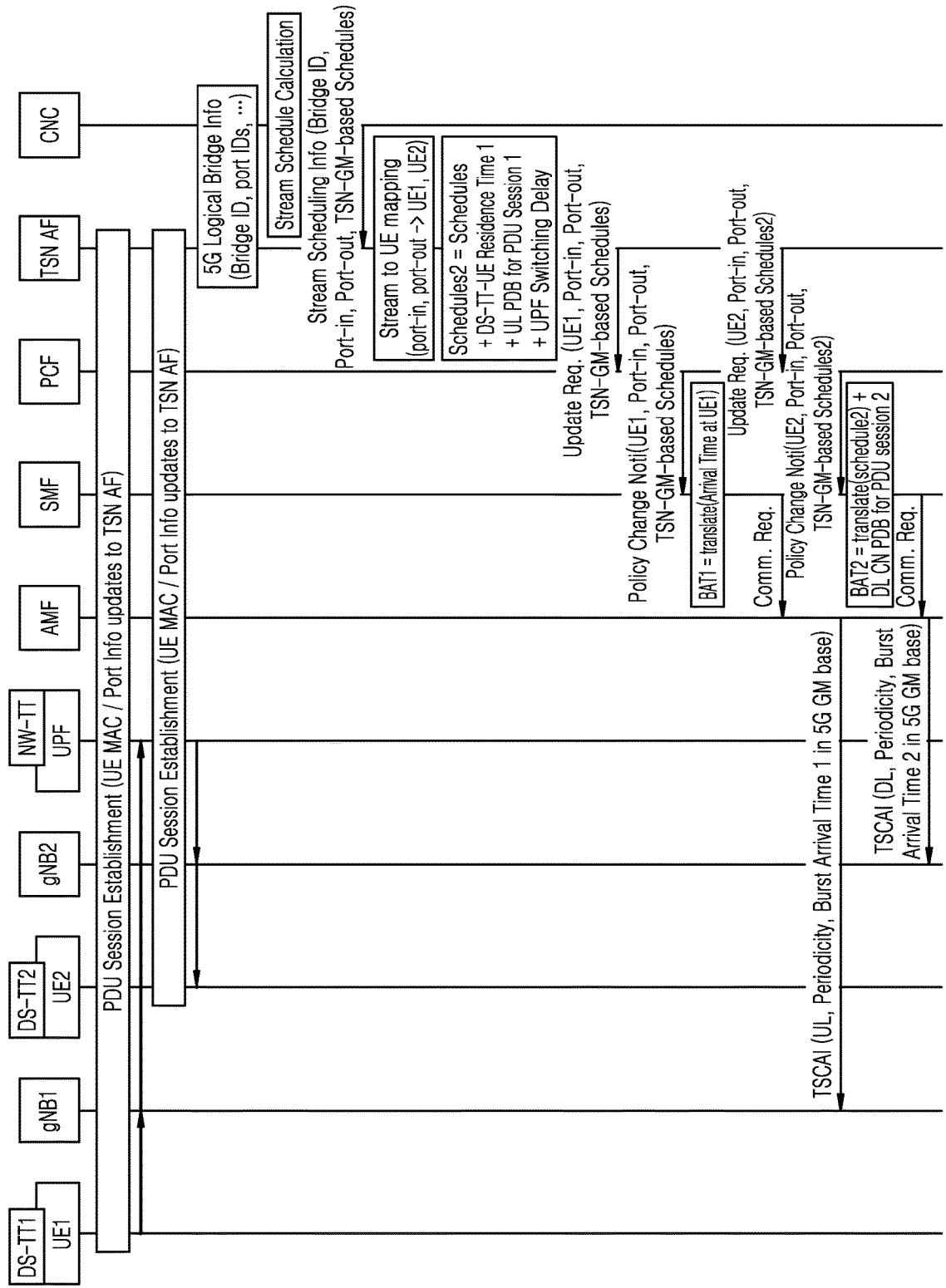
FIG. 19B illustrates a flowchart of a process in which a TSN AF manages schedule information for a new PCF session, according to an embodiment of the disclosure.

FIG. 19B is a flowchart of a process in which a TSN AF manages schedule information for a new PCF session, according to an embodiment of the disclosure.

Referring to FIG. 19B, the TSN AF may generate Schedule information for PDU Session2 by adding DS-TT-UE Residence Time and an UL PDB to Schedule information for PDU Session1, and may deliver the generated Schedule information to an SMF. The Schedule information may further include UPF switching delay.

The SMF may change the received Schedule information, based on a 5GS Clock, and may add a CN PDB to a result of the changing. Referring to FIG. 19B, translate (schedule2) has been represented. At this time, the TSN AF may change DS-TT-UE Residence Time and a UL PDB based on a 5GS GM Clock to those based on a TSN GM Clock.

Figure 20A:
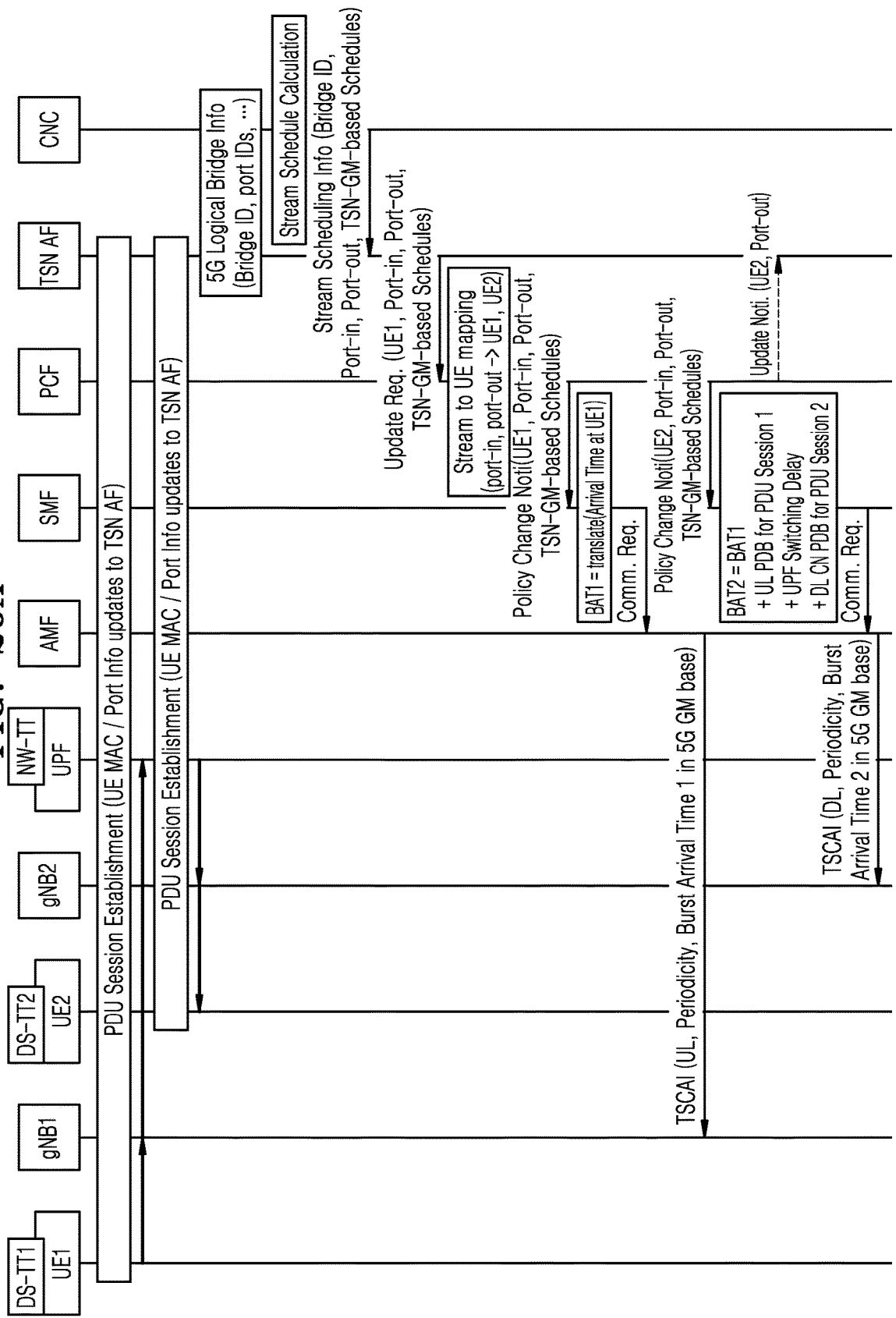
FIG. 20A illustrates a flowchart of a process in which a PCF applies TSCAI to a 3GPP network by managing information in order to support TSC from a UE to another UE, according to an embodiment of the disclosure.

FIG. 20A is a flowchart of a process in which a PCF applies TSCAI to a 3GPP network by managing information in order to support TSC from a UE to another UE, according to an embodiment of the disclosure.

A CNC server ascertains Configuration information for each Port of a 5G network via a TSN AF. Because the Configuration information for each Port includes information of neighboring ports for each port, the CNC server may ascertain a Port through which Stream is to pass, between a Talker and a Listener. Because the Configuration information for each Port includes a Scheduling capability of each TSN node or TSN Bridge, the CNC server may determine Schedule information of Stream for each Port between Talker and Listener, and inform the determined Schedule information. The CNC server delivers the Stream Schedule information to the 5G network via the TSN AF. The Stream Schedule information is delivered from the TSN AF to an SMF via the PCF. When the Stream Schedule information is delivered from the TSN AF via the PCF, the Stream Schedule information is delivered to a thing related with a PDU Session of one of DS-TT1/UE1 and DS-TT2/UE2. For example, when a PDU Session corresponding to DS-TT1/UE1 is determined, the Stream Schedule information is delivered to a PCF corresponding to the determined PDU Session. The PCF finds DS-TT1/UE1 and DS-TT2/UE2 corresponding to Port-in and Port-out, and delivers the Stream Schedule information to an SMF that corresponds to each of PDU Session1 and PDU Session2 respectively corresponding to DS-TT1/UE1 and DS-TT2/UE2. At this time, when the PCF is unable to directly give information to the SMF corresponding to PDU Session2, namely, when an SMF for PDU Session1 and an SMF for PDU Session2 are different and PCFs respectively connected to the SMFs are different, a PCF bound with an SMF is searched for and information is delivered by a found PCF to the SMF.

In response to information for PDU Sesion1, the SMF converts BAT1 of TSCAI corresponding to DS-TT1/UE1 into 5G GM reference information, based on the TSN GM, and delivers the 5G GM reference information to a gNB via a PDU Session Modification procedure. In response to information for PDU Sesion2, the SMF calculates BAT2 of TSCAI corresponding to DS-TT2/UE2. BAT2 is calculated by adding Uplink PDB of PDU Session1, Local Switching Delay in a UPF, and Downlink CN-PDB of PDU Session2 to BAT1. The SMF delivers BAT2 to the gNB via a process of updating only a RAN Parameter during a PDU Session Modification procedure with respect to PDU Session2.

Figure 20B:
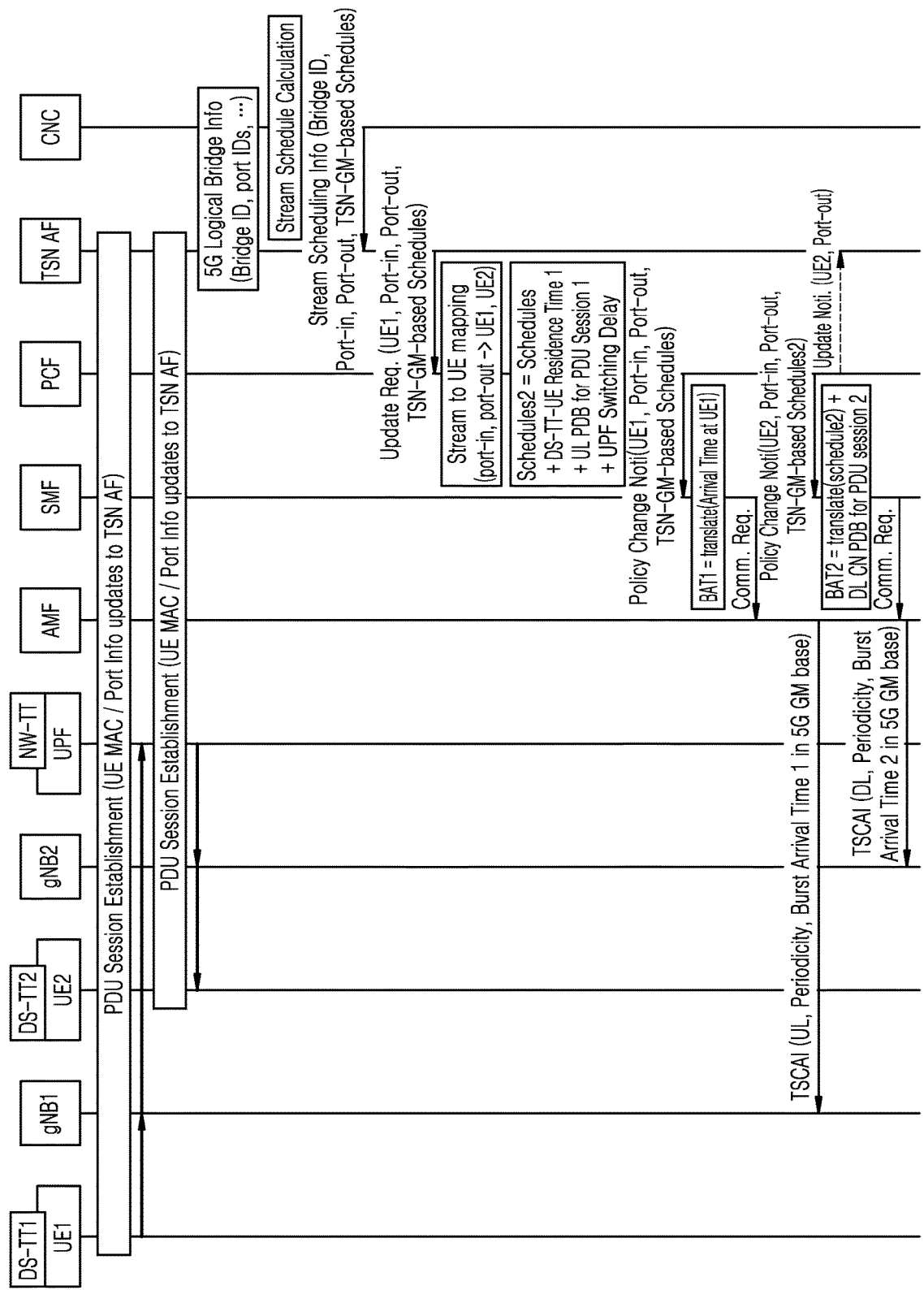
FIG. 20B illustrates a flowchart of a process in which a PCF manages schedule information for a new PCF session, according to an embodiment of the disclosure.

FIG. 20B is a flowchart of a process in which a PCF manages schedule information for a new PCF session, according to an embodiment of the disclosure.

Referring to FIG. 20B, the PCF may generate Schedule information for PDU Session2 by adding DS-TT-UE Residence Time and an UL PDB to Schedule information for PDU Session1, and may deliver the generated Schedule information to an SMF.

The SMF may change the received Schedule information, based on a 5GS Clock, and may add a CN PDB to a result of the changing. Referring to FIG. 20B, translate (schedule2) has been represented. At this time, the PCF may change DS-TT-UE Residence Time and a UL PDB based on a 5GS GM Clock to those based on a TSN GM Clock.

The above-described processes of FIGS. 10 through 20B are also applicable to a case where, when a TSN GM is located on the side of a UE, Time Synchronization is achieved from a UE to a plurality of UEs. For example, to perform time synchronization with respect to a plurality of UEs, the above-described processes of FIGS. 10 through 20B may be applied by increasing the number of PDU Sessions by the number of UEs.

FIGS. 17 through 20B are also applicable to a case where the TSN GM is not located on the side of a UE but on the side of a UPF. Regardless of whether a GM is located on the side of a UE or a UPF, inter-UE information delivery based on Stream information is necessary for TSC communication. In other words, a process of delivering TSCAI between UE1 corresponding to Port-in and UE2 corresponding to Port-out is necessary.

In FIGS. 17 through 20B, UPF Local Switching delay may be calculated as 0 in some cases. BAT1 of TSCAI is calculated by adding UE-DS-TT Residence of UE1/DS-TT1 to a result of changing schedule information based on translate (Arrival Time at UE1)=translate (schedule)=TSN GM Clock to schedule information based on the 5GS GM Clock.

Referring to FIGS. 17 through 20B, Residence Time within the UPF may be separately considered and calculated. In other words, a value obtained by excluding UL UPF Residence Time from a UL PDB for PDU Session 1 is used as a UL PDB, a value obtained by excluding DL UPF Residence Time from a DL CN-PDB for PDU Session 2 is used as a DL CN-PDB, and UE-to-UE UPF Residence Time is used instead of UPF Local Switching delay, and thus these values may be calculated using the same manner as described above. At this time, when the SMF does not know UPF Residence Time in FIGS. 19B and 20B, the TSN AF previously and additionally subtracting DL UPF Residence Time for PDU Session 2 from Schedule2 when calculating Schedule2, and the SMF calculates BAT2 of TSCAI by using an existing DL CN-PDB from which DL UPF Residence Time has not been subtracted. UPF Residence Time refers to a time period from a time point when Packet enters the UPF to a time point when Packet exits from the UPF.

The processes of FIGS. 9 through 20B utilize a PDU Session Modification procedure, information of the UPF is delivered to the TSN AF along a path of UPF-SMF-PCF-TSN AF, and information of the TSN AF is delivered to the UPF along a path of TSN AF-PCF-SMF-UPF. However, when the UPF is connected directly to a Network Function (NF) and a Control Plane, the UPF and the TSN AF may directly communicate with each other, and thus the processes of FIGS. 9 through 20B may be applied.

Figure 21:
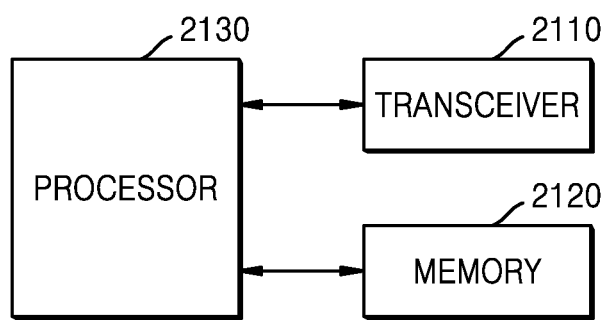
FIG. 21 illustrates a block diagram of a UE according to an embodiment of the disclosure.

FIG. 21 is a block diagram of a UE according to an embodiment of the disclosure.

Referring to FIG. 11, the UE may include a transceiver 2110, a memory 2120, and a processor 2130. The processor 2130, the transceiver 2110, and the memory 2120 of the UE may operate according to the above-described communication method of the UE. However, components of the UE are not limited thereto. For example, the UE may include more or fewer components than those shown in FIG. 21. Furthermore, the processor 2130, the transceiver 2110, and the memory 2120 may be implemented as a single chip.

The transceiver 2110, which collectively refers to a receiver of the UE and a transmitter of the UE, may transmit or receive signals with a base station or network entities. The signal transmitted or received to or from the base station may include control information and data. To this end, the transceiver 2110 may include a radio frequency (RF) transmitter that up-converts and amplifies the frequency of a signal to be transmitted, and an RF receiver that low-noise-amplifies a received signal and down-converts the frequency of the received signal. However, this is only an embodiment of the transceiver 2110, and the components of the transceiver 2110 are not limited thereto.

The transceiver 2110 may receive a signal and output the signal to the processor 2130 through a wireless channel, and may transmit the signal output by the processor 2130 through a wireless channel.

The memory 2120 may store data and programs necessary for operations of the UE. Furthermore, the memory 2120 may store control information or data included in a signal obtained by the UE. The memory 2120 may include storage media, such as read-only memory (ROM), random access memory (RAM), a hard disk, compact disc (CD)-ROM, and a digital versatile disc (DVD), or a combination thereof.

The processor 2130 may control a series of processes so that the UE may operate according to the embodiments of the disclosure. The processor 2130 may include one or more processors. For example, the processor 2130 may include a communication processor (CP) performing control for communication, and an application processor (AP) controlling an upper layer, such as an application program.

Figure 22:
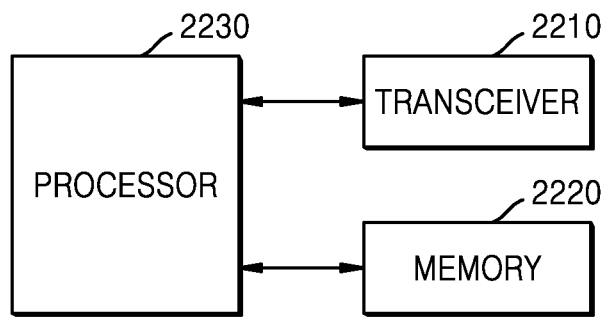
FIG. 22 illustrates a block diagram of a network entity according to an embodiment of the disclosure.

FIG. 22 is a block diagram of a network entity according to an embodiment of the disclosure; and Referring to FIG. 22, the network entity may include a transceiver 2210, a memory 2220, and a processor 2230. The processor 2230, the transceiver 2210, and the memory 2220 of the network entity may operate according to the above-described communication method of the network entity. However, components of the network entity are not limited thereto. For example, the network entity may include more or fewer components than those shown in FIG. 22. Furthermore, the processor 2230, the transceiver 2210, and the memory 2220 may be implemented as a single chip. The network entity may include NFs such as an Access and Mobility management Function (AMF), a Session Management Function (SMF), a Policy and Charging Function (PCF), a Network Exposure Function (NEF), a Unified Data Management (UDM), a User Plane Function (UPF) described above. Also, the network entity may include a base station.

The transceiver 2210, which collectively refers to a receiver of the network entity and a transmitter of the network entity, may transmit or receive signals with the UE or other network entities. The transmitted or received signals may include control information and data. To this end, the transceiver 2210 may include an RF transmitter that up-converts and amplifies the frequency of a signal to be transmitted, and an RF receiver that low-noise-amplifies a received signal and down-converts the frequency of the received signal. However, this is only an embodiment of the transceiver 2210, and the components of the transceiver 2210 are not limited thereto. The transceiver 2210 may include a wired/wireless transceiver, and may include various components for transmitting and receiving signals.

The transceiver 2210 may receive a signal and output the signal to the processor 2230 through a communication channel (e.g., a wireless channel), and may transmit the signal output by the processor 2230 through a communication channel.

The memory 2220 may store data and programs necessary for operations of the network entity. Furthermore, the memory 2220 may store control information or data included in a signal obtained by the network entity. The memory 2220 may include storage media, such as read-only memory (ROM), random access memory (RAM), a hard disk, compact disc (CD)-ROM, and a digital versatile disc (DVD), or a combination thereof.

The processor 2230 may control a series of processes so that the network entity may operate according to the embodiments of the disclosure. The processor 2230 may include one or more processors. The methods according to embodiments of the disclosure as described in the specification or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory (including RAM or flash memory), ROM, electrically erasable programmable read only memory (EEPROM), a magnetic disc storage device, a CD-ROM, DVDs, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, Intranet, a local area network (LAN), a wide LAN (WLAN), and a storage area network (SAN). Such a storage device may access the electronic device performing the embodiments of the disclosure via an external port. Furthermore, a separate storage device on the communication network may access the electronic device performing the embodiments of the disclosure.

In the above-described embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a network entity, the method comprising:
   receiving, from a first user equipment (UE), a sync message via a first protocol data unit (PDU) session; and
   transmitting, to a second UE, the sync message via a second PDU session,
   wherein a sum of residence time for the first PDU session, residence time for the second PDU session, packet delay budget (PDB) of the first PDU session, and PDB of the second PDU session is lower than a residence time upper bound.

2. The method of claim 1,
   wherein a port state of the first UE is a slave state and a port state of the second UE are a master state.

3. The method of claim 1, further comprising:
   receiving, from the first user equipment (UE), an announce message for a best master clock algorithm (BMCA);
   determining, based on the announce message, a port state of the network entity, a port state of the first UE, and a port state of the second UE; and
   transmitting, to the second UE, a regenerated message based on the received announce message.

4. The method of claim 3, further comprising transmitting information associated with the port state of the first UE, the port state of the second UE, or the port state of the network entity.

5. The method of claim 1, wherein the network entity is associated with a user plane function (UPF) including a network time sensitive network translator (NW-TT).

6. A network entity performed in a communication system, the network entity comprising:
   a transceiver; and
   at least one processor connected with the transceiver and configured to:
   receive, from a first user equipment (UE), a sync message via a first protocol data unit (PDU) session, and
   transmit, to a second UE, the sync message via a second PDU session,
   wherein a sum of residence time for the first PDU session, residence time for the second PDU session, packet delay budget (PDB) of the first PDU session, and PDB of the second PDU session is lower than a residence time upper bound.

7. The network entity of claim 6,
   wherein a port state of the first UE is a slave state and a port state of the second UE are a master state.

8. The network entity of claim 6,
   wherein the at least one processor is further configured to:
   receive, from the first user equipment (UE), an announce message for a best master clock algorithm (BMCA),
   determine, based on the announce message, a port state of the network entity, a port state of the first UE, and a port state of the second UE, and
   transmit, to the second UE, a regenerated message based on the received announce message.

9. The network entity of claim 8, wherein the at least one processor is further configured to transmit information associated with the port state of the first UE, the port state of the second UE, or the port state of the network entity.

10. The network entity of claim 6, wherein the network entity is associated with a user plane function (UPF) including a network time sensitive network translator (NW-TT).

* * * * *